(12) United States Patent
Chudak et al.

(10) Patent No.: US 7,308,198 B1
(45) Date of Patent: Dec. 11, 2007

(54) METHOD FOR ALLOCATING PROTECTION BANDWIDTH IN A TELECOMMUNICATIONS MESH NETWORK

(75) Inventors: Fabian A. Chudak, Cambridge, MA (US); Anthony M. Ffrench, South Boston, MA (US); Timothy Y. Chow, Quincy, MA (US)

(73) Assignee: Tellabs Operations, Inc., Naperville, IL (US)

( * ) Notice: Subject to any disclaimer, the term of this patent is extended or adjusted under 35 U.S.C. 154(b) by 939 days.

(21) Appl. No.: 10/150,816

(22) Filed: May 16, 2002

Related U.S. Application Data

(60) Provisional application No. 60/291,508, filed on May 16, 2001.

(51) Int. Cl.
   *H04J 10/20* (2006.01)
(52) U.S. Cl. ............................. 398/58; 398/59; 398/60
(58) Field of Classification Search ............... 398/4–5, 398/10–17, 19, 57–60
   See application file for complete search history.

(56) References Cited

U.S. PATENT DOCUMENTS

| | | | | |
|---|---|---|---|---|
| 6,073,248 | A * | 6/2000 | Doshi et al. | 714/4 |
| 6,643,464 | B1 * | 11/2003 | Roorda et al. | 398/59 |
| 6,647,428 | B1 * | 11/2003 | Bannai et al. | 709/245 |
| 2001/0033548 | A1 | 10/2001 | Saleh et al. | |

FOREIGN PATENT DOCUMENTS

| | | |
|---|---|---|
| EP | 1 146 682 A2 | 10/2001 |
| EP | 1 152 631 A2 | 11/2001 |

OTHER PUBLICATIONS

Wayne D. Grover, et al., "Cycle-Oriented Distributed Preconfiguration: Ring-like Speed with Mesh-like Capacity for Self-planning Network Restoration", Proceedings of IEEE ICC'98, Atlanta Jun. 7-11, 1998, pp. 537-543.

J.W. Suurballe, et al., "A Quick Method for Finding Shortest Pairs of Disjoint Paths", Networks, vol. 14 (1984), pp. 325-336.

Ramesh Bhandari, et al. "High Level Requirements for Optical Shared Mesh Restoration", Network Information Center, Nov. 2000, 7 unnumbered pages.

(Continued)

*Primary Examiner*—Dzung Tran
(74) *Attorney, Agent, or Firm*—Baker Botts L.L.P.

(57) ABSTRACT

A telecommunications mesh network includes a plurality of nodes each interconnected by an edge. A traffic demand is received having a working path with a link of edges interconnecting a source node with a destination node. The telecommunications mesh network has one or more pre-cross-connected trails associated therewith that are subdivided into one or more subtrails. Subtrails that do not meet pre-determined conditions are discarded. A logical graph representation of the telecommunications mesh network is created from subtrails that have not been discarded. Unused, shortcut, and rival edges are inserted into the logical graph. A shortest admissible protection path from the source node to the destination node is identified from the logical graph.

20 Claims, 8 Drawing Sheets

OTHER PUBLICATIONS

Wayne D. Grover, et al., "Cycle-Oriented Distributed Preconfiguration: Ring-like Speed with Mesh-like Capacity for Self-Organizing Proactive Network Restoration," Presentation Slides, 9 unnumbered pages, ICC '98, Jun. 7-11, 1998 Atlanta, Georgia.

Mack-Crane, et al., "Enhancements to GMPLS Signaling for Optical Technologies", AlterNIC—Network Information Center, pp. 1-15, http://www.alternic.org/drafts/drafts-m-n/draft-mack-crane-gmpls-signaling-enhancements.

Kompella, et al., "OSPF Extensions in Support of Generalized MPLS", AlterNIC—Network Information Center, pp. 1-13, http://www.alternic.org/drafts/drafts-k-1/draft-kompella -ospf-gmpls-extensions-00.html.

Papadimitriou, et al., "Generalized MPLS Architecture for Multi-Region Networks", pp. 1-28, http://www.ietf.org/internet-drafts/draft-vigoureux-shiomoto-ccamp-gmpls-mrn-00.txt, Oct. 2002.

Mannie, et al., "Extensions to OSPF and IS-IS in support of MPLS for SDH/SONET Control", AlterNIC—Network Information Center, pp. 1-25, file://C:/Documents%20 and %20Settings/CFISH/Local%20Settings/Temp/Temporar, Jul. 2002.

Mannie, et al., "GMPLS Extensions to OSPF and IS-IS for SONET/SDH Network Control", CCamp Working Group, pp. 1-15, Jun. 2002.

Bernstein, "Interdomain optical routing", Journal of Optical Networking, vol. 1, No. 2, pp. 80-92, Feb. 2002.

Bernstein, "Framework for MPLS-Based Control of Optical SDH/SONET Networks" IEEE Network Jul./Aug. 2001, pp. 20-26.

Information technology—Telecommunications and information exchange between systems—Intermediate system to Intermediate system intra-domain routeing information exchange protocol for use in conjunction with the protocol for providing the connectionless-mode Network Service (ISO 8473), Reference No. ISO/IEC 10589:1992(E), International Standard, cover page+pp. 122-125, Jun. 15, 1992.

"Private Network-Network Interface Specification Version 1.0" (PNNI1.0), af-pnni-0055.000, The ATM Forum Technical Committee, Mar. 1996.

Coltun "The OSPF Opaque LSA Option", Network Working Group, 13 unnumbered pages, http://www.ietf.org/rfc/rfc2370.txt?number=237, Jul. 1998.

Katz "Traffic Engineering Extensions to OSPF", Network Working Group, 9 unnumbered pages, http://www.watersprings.org/links/mlr/id/draft-katz-ospf-traffic 06.1.

Li, et al., "IS-IS extensions for Traffic Engineering", Network Working Group, 11 unnumbered pages, http://search.ietf.org/internet-drafts/draft-ietf-isis-traffic 0.4, Aug. 2001.

Kompella, et al., "Routing Extensions in Support of Generalized MPLS", Network Working Group, 20 unnumbered pages, http://search.ietf.org/internet-drafts/draft-ietf-ccamp-gmpls-routing01.

Kompella, et al., "OSPF Extensions in Support of Generalized MPLS", CCAMP Working Group, 9 unnumbered pages, http://www.ietf.org/internet-drafts/draft-ietf-ccamp-ospf-gmpls-extensions03.

Kompella, et al., "IS-IS Extensions in Support of Generalized MPLS", Network Working Group, 9 unnumbered pages, http://www.ietf.org/internet-drafts/draft-ietf-isis-gmpls-extensions07.

Kompella, et al., "LSP Hierarchy with MPLS TE", Network Working Group, 10 unnumbered pages, http://search.ietf.org/internet-drafts/draft-ietf-mpls-1sp-hierarchy-03.

Kompella, et al., "Link Bundling in MPLS Traffic Engineering", 9 unnumbered pages, http://search.ietf.org/internet-drafts/draft-ietf-mpls-bundle-01.

Katz "Traffic Engineering Extensions to OSPF", Network Working Group, 9 unnumbered pages, http://www.watersprings.org/links/mlr/id/draft-katz-ospf-traffic 06.1, 2002.

Kompella, et al., "Routing Extensions in Support of Generalized MPLS", Network Working Group, 20 unnumbered pages, http://search.ietf.org/internet-drafts/draft-ietf-ccamp-gmpls-routing01, 2001.

Kompella, et al., "OSPF Extensions in Support of Generalized MPLS", CCAMP Working Group, 9 unnumbered pages, http://www.ietf.org/internet-drafts/draft-ietf-ccamp-ospf-gmpls-extensions03, 2003.

Kompella, et al., "IS-IS Extensions in Support of Generalized MPLS", Network Working Group, 9 unnumbered pages, http://www.ietf.org/internet-drafts/draft-ietf-isis-gmpls-extensions07, 2000.

Kompella, et al., "LSP Hierarchy with MPLS TE", Network Working Group, 10 unnumbered pages, http://search.ietf.org/internet-drafts/draft-ietf-mpls-1sp-hierarchy-03, 2003.

Kompella, et al., "Link Bundling in MPLS Traffic Engineering", 9 unnumbered pages, http://search.ietf.org/internet-drafts/draft-ietf-mpls-bundle-01, 2001.

Mack-Crane, et al., "Enhancements to GMPLS Signaling for Optical Technologies", AlterNIC—Network Information Center, pp. 1-15, http://www.alternic.org/drafts/drafts-m-n-draft-mack-crane-gmpls-signaling-enhancements, 2002.

Kompella, et al., "OSPF Extensions in Support of Generalized MPLS", AlterNIC—Network Information Center, pp. 1-13, http://www.alternic.org/drafts/drafts-k-1/draft-kompella -ospf-gmpls-extensions-00.html, 2002.

* cited by examiner

METHOD FOR ALLOCATING PROTECTION BANDWIDTH IN A TELECOMMUNICATIONS MESH NETWORK

RELATED APPLICATIONS

The present application claims the benefit of Provisional Application No. 60/291,508 filed May 16, 2001.

TECHNICAL FIELD OF THE INVENTION

The present invention relates in general to telecommunications network design and more particularly to a method for allocating bandwidth in a telecommunications mesh network.

BACKGROUND OF THE INVENTION

Modern optical networks carry large amounts of traffic, so it is imperative that they be able to survive an accidental failure such as a fiber cut or a node failure. The simplest way to protect a light path against failures is to employ 1+1 or dedicated protection. That is, in addition to the primary or working path, one allocates a secondary or protection path and transmits a duplicate copy of the traffic along the protection path. If there is a failure on the working path, then one switches to the protection path.

FIG. 1 shows an example of a square mesh network. The square mesh network may have four nodes A-D, five physical links L, and two demands D1 and D2. Each demand is allocated two disjoint routes, a working path W and a protection path P. Note that on physical link AD, the protection paths P of each demand overlap. On this physical link, two units of capacity must be allocated.

Dedicated protection works well, but in many cases it is overkill. The reason is that in many networks, the probability of two or more simultaneous failures is so small as to be negligible. Therefore, if two distinct working paths have no common point of failure, then it makes sense for their respective protection paths to share bandwidth, because the probability that both working paths will request use of the protection bandwidth at the same time is negligible. For example, in FIG. 1, the two working paths are completely disjoint from each other so it makes sense to allow them to share protection bandwidth. If we allow sharing, then only one unit of capacity is needed on link AD.

Shared protection requires more complex signaling and therefore somewhat more expensive equipment than dedicated protection, but the savings in bandwidth and equipment that it provides makes shared protection an attractive option to many carriers.

The choice between dedicated and shared protection is not the only choice that must be made by the designer of a survivable optical network. A choice must also be made between link-based and path-based, or end-to-end, protection. In link-based protection, the nodes A and B at either end of a failed link are responsible for detecting the failure and re-routing on a protection path P around the failure. The failed link may be utilized by a large number of different light paths, each with a different source and destination. After the failure, these light paths travel from their source node to node A as before, then take the protection path P to get to node B, then finally travel from node B to their final destinations. For example, Synchronous Optical NETwork (SONET) Bi-directional Line Switched Ring (BLSR) networks use a shared link-based protection. In path-based protection, it is the source and destination nodes of each individual light path that are responsible for detecting the failure and re-routing on a protection path. As in link-based protection, a single failed link may cause many different light paths to fail. Now, however, each one of these light paths is free to travel on a completely different protection path from source to destination. In particular, there is no need for it to visit the nodes A and B at the ends of the failed link. For example, SONET Unidirectional Path Switched Ring (UPSR) networks use dedicated path-based protection.

There are several factors to consider when choosing between link-based or path-based protection. Shared path-based protection tends to use less total bandwidth than shared link-based protection. One reason is that in link-based protection, there is a backhaul problem. A protection light path may travel to node A and then double back on itself in order to get to node B. Shared link-based protection tends to be faster than shared path-based protection. The reason is that in link-based protection, the failure detection and repair happens locally, whereas in path-based protection the signals must travel all the way to the source and the destination. Furthermore, as already mentioned, a single fiber cut usually triggers a large number of alarms in a path-based scheme and processing all these alarms simultaneously can bog down the network. It is difficult if not impossible for a link-based scheme to protect against node failures. Link-based schemes rely on the nodes on either end of a link to perform a protection switch. If one of these nodes fails, then it cannot perform the switch. A path-based scheme can simply choose node-disjoint paths from end to end for all its light paths and then node failures are automatically survivable unless it is the source or destination node that fails, but in that case it is impossible to recover from the failure anyway.

It is well known that SONET rings provide fast protection (50 ms for a ring of circumference at most 1200 km that carries no extra traffic), even on a BLSR, which uses shared protection. Conventional shared mesh protection networks cannot match the speed of a SONET BLSR ring. In a SONET BLSR network, only the nodes on either side of a failure need to make a real-time switch. The rest of the protection path is pre-cross-connected so that the intermediate nodes on the protection path simply pass through the traffic without having to make a switching decision. By contrast, in a shared mesh environment, every intermediate node along the protection path may have to make a real-time switch. This adds considerable delay to the protection switching time.

FIG. 2 shows how the shared mesh network adds delay in the protection switching time. The two working paths have no common point of failure, so let us assume that they share protection bandwidth on the link AE. Now, if the WD1 working path fails, then node E must connect AE to EB, whereas if the WD2 working path fails, then node E must connect AE to ED. Therefore, node E must decide in real time which switch to perform and then perform it. There is no way that node E can be pre-cross-connected to pass through all the protection traffic that it sees. Notice further that this issue can arise regardless of whether one uses link-based or path-based shared mesh protection.

Recognizing these issues, the concept of a "p-cycle" has been proposed. The idea is to route the working traffic using an arbitrary mesh routing algorithm, but to constrain the protection paths to lie on certain predetermined "p-cycles" or rings. These p-cycles are pre-cross-connected just as in a SONET BLSR network. With p-cycles, the troublesome multi-way "branch point" illustrated in FIG. 2 at node E never occurs. When a failure occurs, the nodes at either end of the failure must react and perform a real-time switch, but all the intermediate nodes on the protection path simply pass through the traffic. Fast ring-like restoration speeds are thereby achieved. The bandwidth efficiency of p-cycles is high. Constraining the protection paths to lie on p-cycles might seem to be a very stringent requirement that would carry a high bandwidth penalty. In practice, however, this bandwidth penalty has proved to be very small. More importantly though, the p-cycle scheme is inherently link-based. So it has all the usual pros and cons of link-based schemes explained above. In particular, node failures cannot be survived. To date, there has been no approach to provide a mesh network with shared path-based protection that provides bandwidth efficiency and retains the efficiency of protection switching times of SONET rings.

SUMMARY OF THE INVENTION

From the foregoing, it may be appreciated by those skilled in the art that a need has arisen for an ability to provide protection path in a mesh network with fast protection switching capabilities. In accordance with the present invention, a method for allocating protection bandwidth in a telecommunications mesh network is provided that substantially eliminates or greatly reduces disadvantages and problems associated with conventional bandwidth allocation techniques.

According to an embodiment of the present invention, a bandwidth efficient scheme to route the protection paths in an arbitrary path-based protection mesh network is provided. The bandwidth efficient scheme is provided in such a way that all the protection paths can be pre-cross-connected, so that the switching time when a single network failure occurs is as short as possible in order to match the SONET BLSR switching time. According to one embodiment of the present invention, this may be achieved by keeping track of all possible pre-cross-connections, using pre-cross-connection trails (PXT) and a variant of Dijkstra's algorithm coined a constrained Dijkstra algorithm.

For example, a method for allocating protection bandwidth in a telecommunications mesh network includes receiving a demand to provide a protection path from a source node to a destination node in the telecommunications mesh network. The demand has a pre-determined working path with a link of edges interconnecting the source node to the destination node. One or more pre-cross-connected trails of the telecommunications mesh network are subdivided into one or more subtrails. Any subtrail that do not meet any of one or more pre-determined conditions are discarded. A logical graph representation of the telecommunications mesh network is created from the subtrails that have not been discarded. A shortest admissible protection path from the source node to the destination node is identified from the logical graph.

The present invention provides various technical advantages over conventional mesh networks. For example, one technical advantage is to process the mesh network one demand at a time to allocate disjoint end-to-end working and protection paths. The protection path is chosen to maximize sharing and minimize bandwidth usage, subject to the constraint that no "branch points" are created. Another technical advantage is that switch completion times are much faster than those of any conventional shared mesh network algorithm. Approximately two to three milliseconds of switching time per node on the protection path is saved by establishing pre-cross-connections. Yet another technical advantage is that there is a 20% to 40% total bandwidth savings over dedicated protection. This saving is of the same order of magnitude as that of competing shared link-based mesh algorithms using the p-cycle approach. Still another technical advantage is that dynamic traffic is handled without difficulty. One weakness of p-cycles is that maximum bandwidth efficiency is achieved with large p-cycles, and if traffic demands are arriving gradually over time, then the carrier must choose between allocating small p-cycles that meet current demand cheaply but are inefficient over the long run, and allocating large p-cycles that may eventually be cheaper but require large capital expenditure up front. The PXT algorithm, on the other hand, is based on trails rather than cycles, which grow smoothly along with the traffic. Further, node protection is easily provided due to the path-based protection implementation.

Conventional link-based networks provide some bandwidth efficiency and a quick restoration capability but cannot handle dynamic traffic nor recover from node failures. Conventional path-based networks provide bandwidth efficiency and recovery from node failures but cannot handle dynamic traffic nor provide a quick restoration capability. Utilizing the conventional p-cycle approach only enhances the restoration capability of a link-based network but does not address dynamic traffic situations or node failures. On the other hand, the present invention with its pre-cross-connection technique in a path-based mesh network provides all four of bandwidth efficiency, a fast restoration capability, node failure recovery, and dynamic traffic handling not capable of being provided in conventional network schemes. Other examples of advantages may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
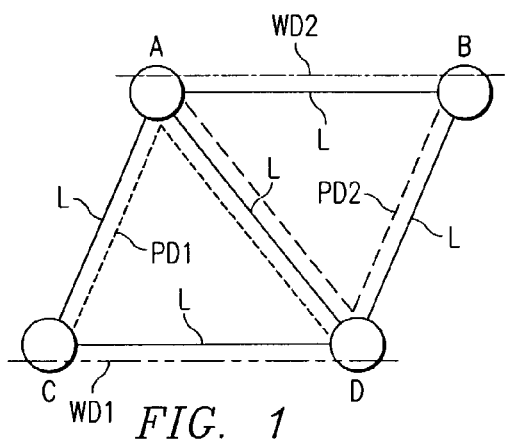
FIG. 1 illustrates a block diagram of an example of a square mesh network.
Figure 2:
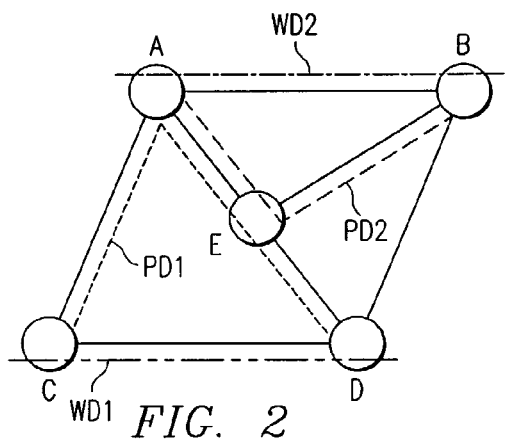
FIG. 2 illustrates a block diagram of how the shared mesh network adds delay in the protection switching time.
Figure 3:
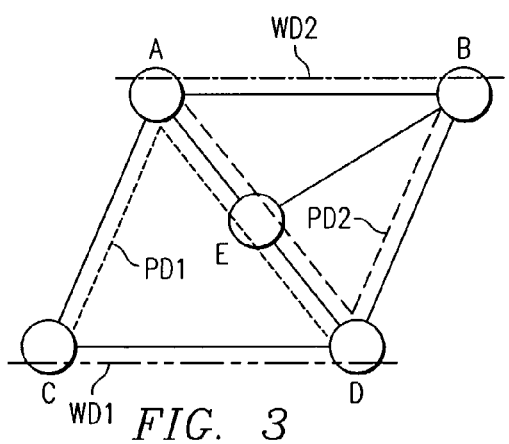
FIG. 3 illustrates a block diagram of an example of an arbitrary mesh shared path-based protection telecommunications network.

FIG. 3 is an example of an arbitrary mesh shared path-based protection telecommunications network 10. Telecommunications network includes a collection of geographically dispersed network elements, called nodes ABCDE, connected by communication links e (e.g., fiber, wireless links). The topology of the telecommunications network 10 may be represented by an undirected graph G. In operation, successive requests are made for a bi-directional demand D1 to be routed between two nodes C and D and a bi-directional demand D2 to be routed between nodes A and B in graph G. After a request is received, two interior-disjoint paths need to be allocated for each demand: a working path WD1/WD2 and a protection path PD1/PD2. The purpose of protection path PD1 and PD2 is to route the requested demand in case of a single network failure in working path WD1 or WD2. Working paths WD1 and WD2 need to allocate dedicated bandwidth while protection paths PD1 and PD2 do not, i.e., it can be shared among different demands.

When a network failure occurs, the working paths of some demands are broken. Each one of these demands has to be switched to its corresponding protection path. Conventional telecommunication networks typically desire the switching time to be a short as possible. For example, in a SONET BLSR the switching time has to be below 50 ms. It is desirable to have a short switching time like this in an arbitrary mesh network. To accomplish this, the present invention contemplates determining specific pre-cross-connections for telecommunications network 10.

FIG. 3 shows an example of how pre-cross-connection can be applied in a mesh network. With working paths WD1 and WD2, there are respective protection paths PD1 and PD2. On both AE and ED, protection paths PD1 and PD2 can share bandwidth. The important point is that the "branch point" at node E has now been removed, so AE and ED can be pre-cross-connected. Furthermore, despite appearances, ED can be pre-cross-connected to DB as well. To see this, note first that if working path WD1 fails, then the pre-cross-connection between ED and DB is exactly what we want, because it allows the intermediate node D to pass through protection traffic without making a real-time switch. On the other hand, if working path WD2 fails, then node D must indeed break this pre-cross-connection, but the point is that for this failure, node D is not an intermediate node on the protection path but an endnode. Therefore it must perform a real-time switch in any case, and no additional delay is incurred by requiring it to break the cross-connection between ED and DB.

Figure 4:
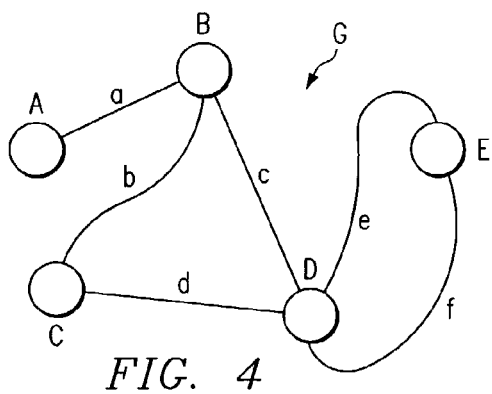
FIG. 4 illustrates a block diagram of an example of a generic graph G used to provide a summary of some graph-theoretic terminology

FIG. 4 is an example of a generic graph G used to provide a summary of some graph-theoretic terminology in order to provide a better understanding of the present invention. By a graph we mean an undirected multigraph, i.e., an undirected graph that may have multiple edges. An edge is also called a link connection. A link in a graph G is the set of all edges between a given pair of nodes. (The terms "link" and "link connection" are intended to be reminiscent of the ITU terms "regenerator section link" and "regenerator section link connection"; however, the reader should not take this similarity in terminology too literally.) Two edges that share exactly one endnode v in common are said to be incident to each other at v. Note that according to this convention, edges on the same link are not considered to be incident. The degree of a node v is the number of edges that have v as an endnode. In graph G, there are two edges or link connections on the link between nodes D and E, namely e and f. The degree of node D is 4.

A walk in G is an alternating sequence of nodes and edges $(v_0, e_1, v_1, e_2, v_2, \ldots, V_{n-1}, e_n, v_n)$ in G such that for all i, the endnodes of $e_i$ are $v_{i-1}$ and $v_i$. A trail is a walk whose edges are all distinct and a path is a walk whose nodes are all distinct. A walk is closed if $v_0=v_n$. Note that a path cannot be closed unless n=0. A subwalk of the walk $W=(v_0, e_1, v_1, e_2, v_2, \ldots, v_{n-1}, e_n, v_n)$ is a walk that is either a consecutive subsequence $(v_i, e_{i+1}, v_{i+1}, e_{i+2}, v_{i+2}, \ldots, v_{1+j-1}, e_{i+j}, v_{i+j})$ or the reversal of such a consecutive subsequence. If W is closed, then consecutive subsequences that "wrap around" the ends of W are also considered to be subwalks. If a subwalk of W is a trail (resp. path) then we call it a subtrail (resp. subpath) of W (even if W itself is not a trail or a path). Unless otherwise specified, a walk (trail, path) is considered to be identical to its reversal. In graph G2, (C, d, D, f, E, e, D, d, C) is a walk but not a trail because the edge d is repeated. On the other hand, (C, d, D, f, E, e, D, c, B, b, C) is a trail, in fact a closed trail, but not a path because the node D is repeated. Finally, (D, d, C, b, B) is a subtrail of this trail, and is in fact a path.

Two walks in G are link-disjoint if there is no link that both of them traverse. The interior of a walk is the set $\{v_1, v_2, \ldots, v_{n-1}\}$, i.e., the set of all of its nodes other than its endnodes. Two walks are interior-disjoint if they are link-disjoint and no node in the interior of one walk is a node in the other walk. An edge e touches the interior of a walk if either it shares a link with an edge of the walk or one of the endnodes of e is in the interior of the walk. For example, in the above graph, the paths (D, e, E) and (D, f, E) are edge-disjoint but not link-disjoint, and hence they are not interior-disjoint. The paths (A, a, B, c, D) and (C, b, B) are not interior-disjoint, because B is an interior node of the first path that is also a node of the second path. Note also that edge b touches the interior of (A, a, B, c, D). In general, if an edge of one path touches the interior of another, then the two paths cannot be interior-disjoint. On the other hand, the paths (A, a, B, b, C) and (E, e, D, d, C) are interior-disjoint, because even though node C is on both paths, C is not an interior node of either path. By a digraph we mean a directed multigraph, i.e., a multigraph whose edges are directed from one endnode to the other. These are needed in some low-level subroutines. Walks, trails, and paths in digraphs are required to be directed; i.e., if $(v_0, e_1, v_1, e_2, v_2, \ldots, v_{n-1}, e_n, v_n)$ is a walk in a digraph, then $e_i$ must point from $v_{i-1}$ to $v_i$. Walks in digraphs are therefore not identical to their reversals.

The fundamental components of the networks we consider are the topology, the traffic demands, the allocation plan for these traffic demands, and the cross-connection table for the topology. The physical topology is represented by a graph G. Associated with each edge in G is a capacity (either OC-48 or OC-192) and a length. The default length is 1. The logical topology is also represented by a graph, which we call H. The graph H is a duplicate of the graph G, except that some of the OC-192 edges in G are replaced by a set of four OC-48 edges in H, each with the same endnodes and length as the original edge in G. Such edges are called OMUX edges (both in G and in H); the remaining edges are called standard edges.

A traffic demand consists of a set of terminal nodes, a capacity, a level of service, a sharing type, an optional set of edges and nodes in logical graph H. For the capacity, examples are OC-48 and OC-192 with OC-48C and OC-192C being allowed but the present invention treats them exactly like a standard OC-48 or OC-192. The level of service can have one of four values, namely extra traffic, non-preemptible unprotected traffic, mesh protection only, and both mesh and span protection. The sharing type has one of two values, namely 1:N or shared protection and 1+1 or dedicated protection. For OC-192 demands, the traffic demand also includes an indication that there are 0, 1, 2, or 3 OC-48 timeslots of spare capacity.

Traffic demands are of two types: intra-mesh and inter-mesh. An intra-mesh demand has exactly two (distinct) terminal nodes, called the source and destination (all demands are required to be bi-directional and symmetrically routed so it does not matter which node we call the source and which we call the destination). An inter-mesh demand has three terminal nodes, an access node and an unordered pair of homing nodes. The homing nodes must be distinct from each other; however, an access node may coincide with one of the homing nodes. One homing node is designated the primary node and the other is designated the secondary node; it does not matter which one is called which.

The value of N for demands whose sharing type is 1:N must be the same for all demands in the network; this number is called the sharing limit of the network. The default value of N is 16. The sharing type of traffic demands whose level of service is extra traffic or non-preemptible unprotected traffic is not meaningful; in these cases we automatically set the sharing type to 1:N. Alternatively, the sharing type could be omitted entirely in these cases. It does not really matter as a globally consistent convention is chosen. Single homing between mesh subnetworks is also permissible, but such demands should be given as intra-mesh demands for discussion purposes. The level of service of an inter-mesh demand may be contemplated as being either mesh protection only or non-preemptible unprotected traffic. A list of traffic demands may contain multiple copies of the same demand, in order to indicate, for example, that the demand between two nodes consists of several OC-48's with the same level of service and sharing type.

An allocation plan for a set of traffic demands consists of two components, a muxing plan and a routing plan. For muxing plans, two demands are equivalent if their terminal nodes, level of service, and sharing type are the same. Terminal nodes are the same when they are either both intra-mesh or both inter-mesh, and moreover if they are both inter-mesh then the access node of one must be the access node of the other and the homing nodes of one must be the homing nodes of the other. However, the designations of which node is the source and which is the destination, or which homing node is primary and which is secondary, do not have to agree, since these designations are arbitrary anyway.

A muxing plan is a family M of disjoint subsets of the set of traffic demands wherein traffic demands in the same subset are be equivalent, each subset contains at most four members, each subset contains at most one OC-192 demand, and, if a subset contains an OC-192 demand, then the number of OC-48 demands in that subset cannot exceed the spare capacity of the OC-192. The members of a group are said to be muxed together.

A muxing plan may be used to construct a list of adjusted traffic demands as follows. Traffic demands that do not belong to any member of M are left unchanged. Each member of M is replaced by a single traffic demand whose terminal nodes, level of service, and sharing type are inherited from the original traffic demands, whose set of forbidden nodes and edges is the union of the sets of forbidden nodes and edges of the original demands, whose capacity is OC-192, and whose spare capacity is either the spare capacity of the OC-192 demand minus the number of OC-48's in the subset (if there exists an OC-192 in the subset) or four minus the number of OC-48's in the subset (if there is no OC-192 in the subset). It should be emphasized that when constructing adjusted traffic demands, the original traffic demands are not deleted. The list of adjusted traffic demands should be thought of as an additional object that exists alongside the list of original demands, not as something that supersedes it. In particular, after processing has been performed, the user still has full access to the unadjusted traffic demands as well as the information about how they have been muxed.

A routing plan consists of a routing of some or all of the adjusted traffic demands. Thus, some of the demands may not be routed. Specifically, a routing of an (adjusted) intra-mesh demand d consists of a working path w(d) in graph H between the source and the destination, a mesh protection path p(d) in graph H between the source and the destination if the level of service requires mesh protection, and a span protection path s(d) in graph H between the source and the destination if the level of service requires span protection. A routing of an (adjusted) inter-mesh demand d consists of two working paths $w_1(d)$ and $w_2(d)$ in graph H, one between the access node and the primary node and one between the access node and the secondary node, and two mesh protection paths $r_1(d)$ and $r_2(d)$ in graph H, one between the access node and the primary node and one between the access node and the secondary node if the level of service requires mesh protection.

The term protection path refers to either a span protection path or a mesh protection path. An edge that does not appear in any working or protection path is called an unused edge. Usually the adjective "adjusted" is dropped as routings, protection paths, etc., are assumed to be of adjusted traffic demands. Although when describing or specifying an allocation plan, muxing is preferably performed prior to routing, this does not mean determining an allocation plan must first fix all its muxing decisions before making any routing decisions. A muxing plan may first be performed and then later backtrack if a satisfactory routing plan cannot be found or the muxing and routing may be optimized simultaneously, provided that its final output is an allocation plan that can be described by a muxing plan followed by a routing plan for the adjusted demands.

The cross-connection table for a logical topology specifies, for each pair of incident edges in the logical graph H, whether the connection between the edges is intact, pre-cross-connected, or not connected. Exactly one of these three possibilities must be true for every pair of incident edges in graph H. The default value is "not connected." If either the connection between the edges is intact or pre-cross-connected, then the edges are connected. It would consume a lot of memory to explicitly allocate space for each pair of incident edges in graph H. There is no requirement to implement the cross-connection table in this way, as long as the information above is somehow contained in the table. For example, one could store a list of which pairs of incident edges are intact and which are pre-cross-connected, with the understanding that all other pairs of incident edges are not connected.

Not all allocation plans and cross-connection tables as defined above for a given topology and set of traffic demands are actually feasible, because nothing ensures, for example, that the routings of different demands are mutually consistent. For an allocation plan to be feasible, the following consistency conditions should be satisfied. If the capacity of a demand is OC-192, then the capacity of all edges in all of its paths, both working and protection, must be OC-192. In particular, an OC-192 demand is not allowed to be inverse muxed over an OC-192 OMUX link connection. If the capacity of a demand is OC-48, then the capacity of all edges in all of its paths, both working and protection, must be OC-48. In particular, an OC-48 is to use a standard OC-192 timeslot, then it must use an OC-192 timeslot from end to end and this must be specified in the muxing plan. If an edge e appears in a working path of some demand whose level of service is not extra traffic, or if e appears in a protection path of a demand whose sharing type is 1+1, then e may not appear in any path, either working or protection, of any other demand. In particular, stub release is not permitted, the use of the working bandwidth of failed demands to protect other demands. If an edge e appears in a working path of a demand whose level of service is extra traffic, then e may not appear in a working path of any other demand. None of the working or protection paths for a demand can contain an edge or a node from its list of forbidden edges and nodes. If an intra-mesh demand d has a mesh protection path r(d), then the working path w(d) must be interior-disjoint from r(d). A similar condition holds for inter-mesh demands: $w_1(d)$ and $r_1(d)$ must be interior-disjoint and $W_2(d)$ and $r_2(d)$ must be interior-disjoint. If an intra-mesh demand d has both span and mesh protection, then s(d) must be edge-disjoint from w(d) and s(d) must be edge-disjoint from r(d) If $w_1$ and $w_2$ are two distinct working paths that are not interior-disjoint, then their corresponding mesh protection paths $r_1$ and $r_2$ must be edge-disjoint. The two working paths of an inter-mesh demand must be interior-disjoint. Every edge that appears in the working path of a traffic demand whose level of service is extra traffic must also appear in a mesh protection path of a demand whose sharing type is 1:N. The number of protection paths containing a particular edge e must not exceed the sharing limit N. If several OC-48's are muxed into an OC-192 from end to end in the muxing plan, then they collectively count as only one entity as far as the sharing limit is concerned.

For a cross-connection table to be feasible, it must satisfy the following two conditions. An OC-48 edge must never be connected to an OC-192 edge. If $e_1$ and $e_2$ are incident at a node v and the connection between them is either intact or pre-cross-connected, and e is an edge different from $e_2$ that is incident to $e_1$ at v, then the cross-connection table must indicate that e and $e_1$ are not connected (and similarly with the roles of $e_1$ and $e_2$ reversed). We call this condition the matching condition.

For an allocation plan and a cross-connection table (considered together) to be feasible, each of them must be feasible by itself, and they must also satisfy some further conditions so as to be consistent with each other. If $e_1$ and $e_2$ are consecutive edges in the working path of a traffic demand whose level of service is not extra traffic, or if $e_1$ and $e_2$ are consecutive edges in the span protection path of a traffic demand, or if $e_1$ and $e_2$ are consecutive edges in the mesh protection path of a traffic demand whose sharing type is 1+1, then the cross-connection table must indicate that the connection between $e_1$ and $e_2$ is intact. If $e_1$ and $e_2$ are edges that are incident at v, and if the cross-connection table indicates that the connection between them is intact, then if one of $e_1$ and $e_2$ appears in any path P in the routing plan, then both edges must in fact appear in P, and moreover $e_1$ and $e_2$ must appear in consecutive positions. In particular, it follows that no working or protection path can begin with (v, $e_1$) or (v, $e_2$) and no path can end with ($e_1$, v) or ($e_2$, v). The cross-connection table must indicate that the connection between any two consecutive edges in the working path of any demand whose level of service is extra traffic is either intact or pre-cross-connected. If v is the first (resp. last) node of the working path of some demand or of the mesh protection path of a demand whose sharing type is 1+1, if $e_1$ is the first (resp. last) edge of that path, and if $e_2$ is any edge that is incident to $e_1$ at v, then the cross-connection table must indicate that $e_1$ and $e_2$ are not connected. Further, span protection paths must be co-routed with their corresponding working paths, i.e., the sequence of nodes and links traversed by a span protection path must be identical to the sequence of nodes and links traversed by its corresponding working path.

From now on, whenever allocation plan and/or a cross-connection table is referred, it is assumed that they are feasible unless explicitly stated otherwise. A network is an ordered quintuple X=(G, H, S, A, T) consisting of a physical graph G, a logical graph H, a set S of traffic demands, an allocation plan A for S, and a cross-connection table T. Sometimes a subset S' c S will be specified X or A will be restricted to S'. This just means that we delete all traffic demands except those in S'. The topology and cross-connection table remain unchanged. As for the allocation plan, the only tricky part is the muxing plan. If several demands are muxed together in the original then they must remain muxed together upon restriction. In particular, an OC-48 that was muxed together with 1, 2, or 3 other OC-48's must still be muxed up to an OC-192 timeslot even if none of the other OC-48's are in S'.

Figure 5A:
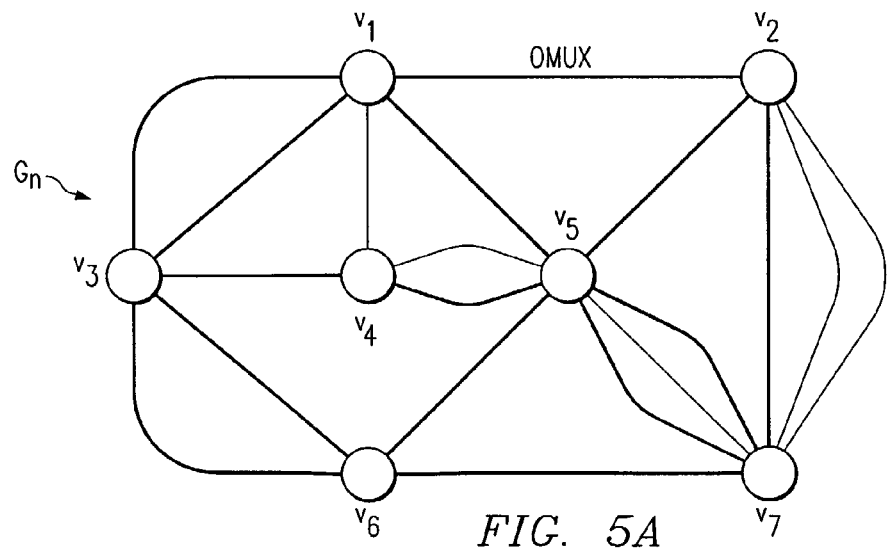
FIGS. 5A-C illustrate block diagrams of physical and logical graphs of a sample network n.
Figure 5B:
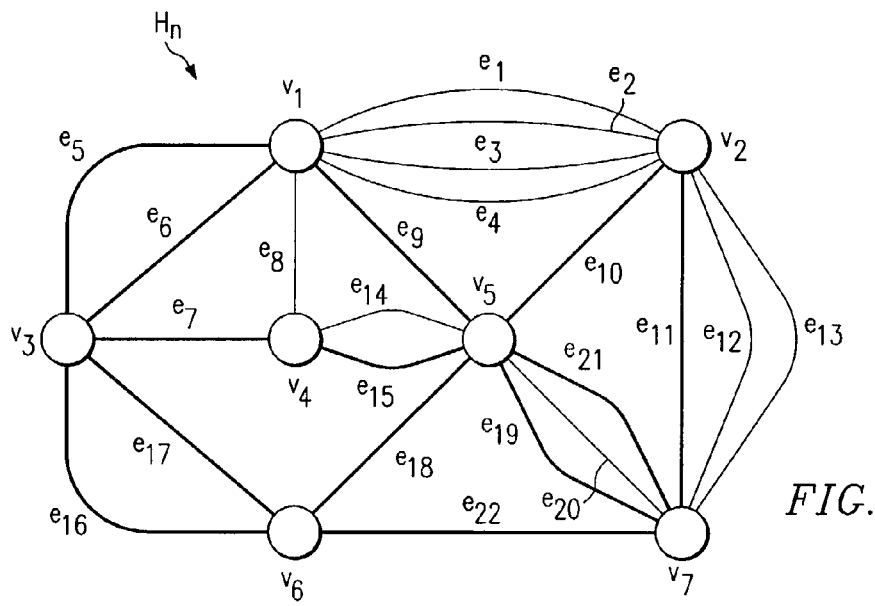
Figure 5C:
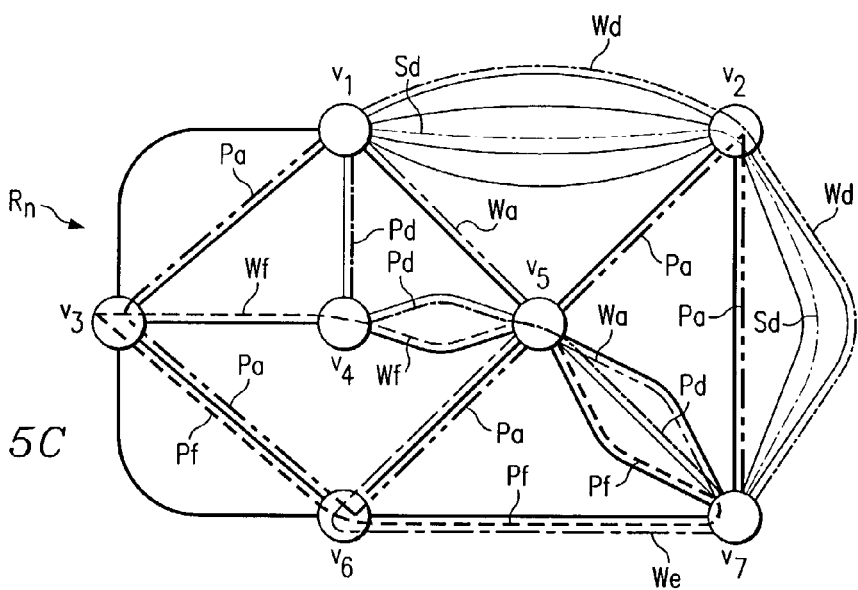

FIGS. 5A-C show an example of a sample network n. FIG. 5A is an example of a physical graph Gn for network n. FIG. 5B is an example of a logical graph Hn for network n. FIG. 5C is an example of a routing plan Rn for network n. There are seven nodes. Thin lines or curves represent OC-48 edges and thick lines represent OC-192 edges. One of the OC-192 edges in graph Gn is an OMUX edge, as indicated; the rest are standard edges. Notice that the OMUX edge turns into four OC-48 edges in graph Hn. The edges in graph Gn are not labeled as reference will be made to edges in graph Hn.

The demands in this example are as follows. Demand a is an inter-mesh OC-192 with access node $v_5$, primary homing node $v_1$, and secondary homing node $v_7$, requiring shared mesh protection. No forbidden nodes or edges, and no free timeslots. Demand b is an intra-mesh OC-192 with source and destination nodes $v_3$ and $v_5$, requiring shared mesh protection. No forbidden nodes or edges, but two free OC-48 timeslots of spare capacity. Demand c is an intra-mesh OC-48 with source and destination nodes $v_3$ and $v_5$, requiring shared mesh protection. Node $v_2$ is a forbidden node. Demand d is an intra-mesh OC-48 with source and destination nodes $v_1$ and $v_7$, requiring dedicated mesh and span protection. No forbidden nodes or edges. Demand e is an intra-mesh OC-192 with source and destination nodes $v_5$ and $v_7$, whose level of service is extra traffic. No forbidden nodes or edges, and no free timeslots.

We now specify a sample allocation plan for these demands. Importantly, this allocation plan is not what the algorithm of the present invention described later would actually produce. It has been artificially constructed for illustrative purposes only. The muxing plan muxes demands b and c together into an adjusted OC-192 demand refer to as demand f. Notice that it is permissible to mux demands b and c together even though they do not have identical lists of forbidden nodes. However, once the decision to mux is made, then demand f must avoid node $v_2$. No other muxing is done. In routing plan Rn, Demands a, d, e, and f are illustrated in routing plan Rn with working paths, mesh protection paths, and span protection paths. After the muxing is done, (adjusted) OC-192 demands travel on OC-192 edges and OC-48 demands travel on OC-48 edges pursuant to the feasibility conditions specified above for every demand in routing plan Rn. Note that the span protection path of demand d is routed on the same links as the working path, as required by the feasibility conditions. In fact, on the OMUX link between $v_1$ and $v_2$, the two paths use the same physical OC-192 edge. Most edges in this example are used by at most one demand. By the feasibility conditions, this is necessarily true if the edge is used by a working path of a demand that is not extra traffic (e.g., edge $e_{21}$) or by a protection path of a demand that requires dedicated protection (e.g., edge $e_{12}$). Protection edges in general may be shared, but in our example this occurs only on edge $e_{17}$. Notice that, in accordance with the feasibility conditions, the working path of demand f is interior-disjoint from the primary working path of demand a in spite of the common node $v_5$.

Finally, the following is a sample pre-cross-connection table for this network. Again, note that this is just an illustration and is not what the algorithms of the present invention described later would actually produce. Intact connections are ($e_7$, $e_{15}$), ($e_1$, $e_{13}$), ($e_3$, $e_{12}$), ($e_8$, $e_{14}$), ($e_{14}$, $e_{20}$), and ($e_{10}$, $e_{11}$). Pre-cross-connected connections are ($e_6$, $e_{17}$) and ($e_{18}$, $e_{22}$). All the intact connections except for ($e_{10}$, $e_{11}$) are mandatory to satisfy the feasibility conditions. The connection between edges $e_{10}$ and $e_{11}$ could be pre-cross-connected and could even be not connected, but there is nothing to prevent making it intact, and making it intact improves the switching speed. According to the feasibility conditions, the connection ($e_{18}$, $e_{22}$) is pre-cross-connected and not intact because for example if $e_9$ fails then $e_{18}$ must be connected to $e_{17}$ and it cannot be not connected because of the extra traffic. The connection ($e_6$, $e_{17}$) could be not connected but it cannot be intact by the feasibility conditions because for example if $e_7$ fails then traffic on $e_{17}$ must be dropped at $v_3$.

Notice that once we pre-cross-connect ($e_{18}$, $e_{22}$), we cannot pre-cross-connect $e_{18}$ or $e_{22}$ to any other edge (such as $e_{17}$) by the matching condition. Notice also that the extra traffic could not have been routed on the edges $e_{10}$ and $e_{12}$, even if demand d had required shared protection rather than dedicated protection, because $e_{12}$ has a mandatory intact connection to $e_3$. At $v_6$ we have a branch point, where two protection paths share an edge (namely $e_{17}$) and then diverge onto separate edges ($e_{18}$ and $e_{22}$). Although this is legal, it is an undesirable situation from the point of view of fast switching speed because even if demand e were not present, it would be impossible to pre-cross-connect both protection paths. The situations at $v_2$ and $v_3$, on the other hand, are fine as they are ring-like in the sense that all the protection paths that pass through the node can be pre-cross-connected and in some cases even made intact. The PXT algorithm described later ensures that no branch points are created. Sometimes, branch points can be avoided only at the cost of reduced bandwidth efficiency, but experimental tests have shown that the efficiency loss is small.

In determining the appropriate protection paths in a mesh network, the algorithm of the present invention requires as an input the network X=(G, H, S, A, T) and a set D of traffic demands (the new traffic) with no allocation plan. The set S may be empty; we call this the greenfield case. In the greenfield case, the logical graph H may be omitted from the input, in which case the algorithm will assume that it is identical to the physical graph G. In general, H will indicate which OC-192 link connections in the network are already configured as OMUX. The output is a network X'=(G', H', S∪D, A', T') such that the physical graph G' and the logical graph H' are duplicates of the input graphs G and H, except that some OC-192 edges that were unused in the original allocation plan A may have switched status from standard to OMUX or vice versa, and the allocation plan A' for S∪D, when restricted to S, coincides with A.

Informally speaking, the algorithm uses a cap-and-grow strategy, i.e., when new traffic is added, existing traffic is not disturbed. So for example, edges that are in use are not allowed to be changed from standard to OMUX because this would require either rerouting an existing OC-192 or breaking it into four separate OC-48's from end to end. However, a strict cap-and-grow strategy is not adopted as a new OC-48 is allowed to use a spare timeslot of an existing OC-192. Moreover, T' is allowed to be quite different from T. Notice that, strictly speaking, deletion of existing demands has not been addressed. However, deletion is a straightforward process that is essentially the same as restriction. Any deletions should simply be made prior to running the main algorithm. Finally, the output may optionally specify what changes can be made to T' without resulting in invalid output. For example, some intact connections on mesh protection paths in the cross-connection table might be optional, and could be changed to pre-cross-connected. Conversely, there might be some pre-cross-connected connections that can be changed to intact connections.

The PXT algorithm of the present invention is described from the bottom up. Shortest-path subroutines of one kind or another form the backbone of the PXT algorithm. The shortest-path subroutines are described with reference to digraphs rather than for graphs. This is no real restriction because given a graph, each undirected edge of the graph can be replaced by a pair of directed edges, one pointing in each direction, with each directed edge having the same length as the original undirected edge. The shortest-path subroutine can then be applied to the resulting digraph.

An example of a shortest path subroutine is Dijkstra's algorithm. Dijkstra's algorithm is a standard subroutine for finding shortest paths in a weighted digraph. Dijkstra's algorithm takes as input a weighted digraph G (i.e., a digraph each of whose edges has a length) and a node u of G. It then computes a shortest-path tree T that is rooted at u, i.e., a tree whose edges are all directed away from u and that contains all nodes that are reachable from u via some directed path and, with the property that for every v in T, the length of the (unique) path from u to v in T is minimal among all paths from u to v in G.

Figure 6:
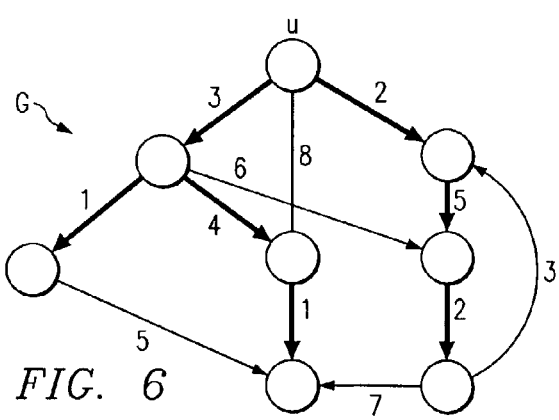
FIG. 6 illustrates a block diagram of the final result of running Dijkstra's algorithm on a particular digraph G.

FIG. 6 shows the final result of running Dijkstra's algorithm on a particular digraph G. Digraph G consists of eight nodes and twelve directed edges with lengths as indicated. The top node is the root node u. The shortest-path tree consists of the thick edges. For every node v in G, the shortest path from u to v consists entirely of the thick edges. Note that Dijkstra's algorithm computes the shortest path from u to every other reachable node of G. In some situations, the shortest path from u to a particular node v of G may be of interest. If this is the case, then Dijkstra's algorithm may be exited early as soon as v is annexed to the shortest-path tree T. This early-exit policy does not improve the worst-case complexity but speeds things up on average. Of course, v may not be reachable from u, in which case Dijkstra's algorithm should report a failure.

If G has n nodes, then we may compute the shortest distances between all pairs of nodes of G by running Dijkstra's algorithm n times with a different node of G as the source node each time. There is a potential pitfall with this idea if G is obtained from an undirected graph by replacing each undirected edge with a pair of directed edges: The shortest path between two nodes of G may not be unique. Therefore, depending on the tie-breaking method selected, the shortest path from u to v as computed by Dijkstra's algorithm may not be the exact reversal of the shortest path from v to u. This is not a serious difficulty since one of the two paths may be arbitrarily discarded. However, it is important for the programmer to be aware of the issue of tie-breaking or else errors may result. A deterministic tie-breaking method should be used so that, if the code is run more than once with the same input, the output will always be the same. At each stage of Dijkstra's algorithm, a priority queue of nodes is maintained that are not yet part of T but that are all potential candidates for being the next node to be added to T. There are many ways of implementing priority queues, e.g., using a binary heap or using a Fibonacci heap. Roughly speaking, binary heaps work well if the degrees of the nodes of G are low while Fibonacci heaps work well if the degrees are high.

Another example of a shortest path subroutine is the Suurballe-Tarjan disjoint pairs algorithm. The Suurballe-Tarjan disjoint pairs algorithm is a fast and simple algorithm that may be used in any situation when disjoint working and protection paths are needed. It can be used regardless of whether there is 1+1 or shared protection and is not known to be implemented within the telecommunications industry. First, given two distinct nodes u and v in a weighted digraph G, find a pair of edge-disjoint paths between u and v whose total length is as small as possible. Second, given three distinct nodes u, v, and w in G, find a pair of edge-disjoint paths, one from u to v and the other from u to w, whose total length is as small as possible. If we have a solution for the first problem, then we can easily solve the second problem by adding a new node v' to G along with an edge of zero length from v to v' and an edge of zero length from w to v'. Applying the solution to the first problem with u and v' in place of u and v, the desired paths for the second problem can be obtained. Thus, only the first problem is considered.

Although the first problem discussed above specifies edge-disjoint paths, it is straightforward to adapt the Suurballe-Tarjan disjoint pairs algorithm to find node-disjoint paths (i.e., paths that have no nodes in common except the source and destination). Begin by creating an auxiliary digraph G' as follows. For each node v in G, create two nodes $v^{in}$ and $v^{out}$ in G' and create a zero-length edge from $v^{in}$ to $v^{out}$. For each edge e in C from u to v, create an edge in G' from $u^{out}$ to $v^{in}$ with the same length as e. Now compute a pair of edge-disjoint paths in G' from $u^{out}$ to $v^{in}$. Finally, translate these paths in G' back into paths in the original digraph G in the obvious way. These paths in G will be node-disjoint because edge-disjoint paths in G' cannot both traverse the edge from $v^{in}$ to $v^{out}$ and therefore cannot both visit $v^{in}$ in the first place.

Figure 7A:
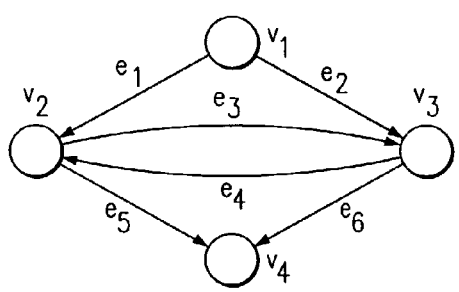
FIGS. 7A-B illustrate block diagrams of how node-disjoint paths are obtained.
Figure 7B:
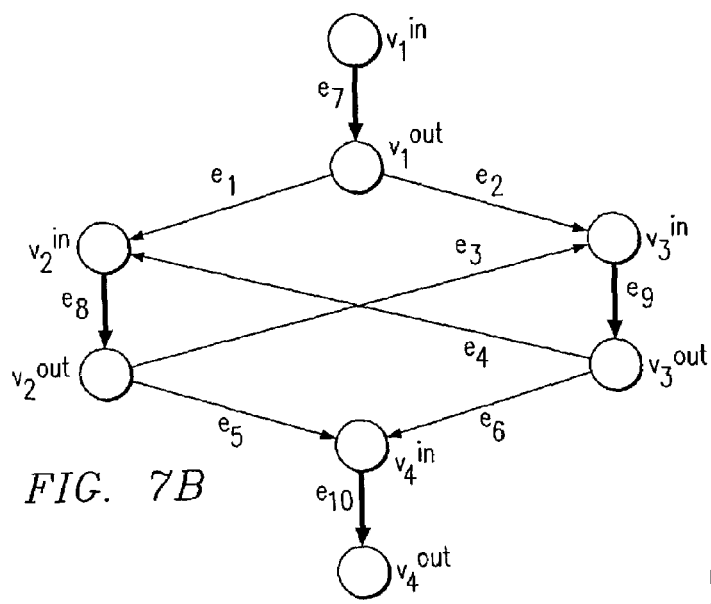

FIGS. 7A-B show how node-disjoint paths are obtained. In FIG. 7A, assume that in digraph G all edges have length one. There are two possible pairs of edge-disjoint paths from $v_1$ to $v_4$, namely $P_1=(v_1, e_1, v_2, e_5, v_4)$ $P_2=(v_1, e_2, v_3, e_6, v_4)$, and $P_3=(v_1, e_1, v_2, e_3, v_3, e_6, v_4)$, $P_4=(v_1, e_2, v_3, e_4, v_2, e_5, v_4)$. Note that $P_1$ and $P_2$ are node-disjoint, while $P_3$ and $P_4$ are not. FIG. 7B shows the auxiliary digraph G'. Each node is split in two and four new zero length edges are added. In the auxiliary digraph G', there is only one pair of edge-disjoint paths from $v_1^{out}$ to $v_4^{in}$, namely $(v_1^{out}, e_1, v_2^{in}, e_8, v_2^{out}, e_5, v_4^{in})$ and $(v_1^{out}, e_2, v_3^{out}, v_3^{out}, e_6, v_4^{in})$, corresponding to the node-disjoint pair of paths $P_1$ and $P_2$ in the original digraph. The other pair of paths, $P_3$ and $P_4$, has no edge-disjoint counterpart in the auxiliary digraph G' because the edges $e_8$ and $e_9$ would have to appear in both paths. So node-disjoint paths in the original digraph G correspond to edge-disjoint pairs in the auxiliary digraph G'. The terms "node-disjoint" and "interior-disjoint" are not synonymous. If $e_1$ and $e_2$ are two edges on the same link and u and v are the endnodes of the link, then the paths (u, $e_1$, v) and (u, $e_2$, v) are node-disjoint but not interior-disjoint. However, this case cannot occur in a graph or digraph that has no multiple edges.

Figure 8A:
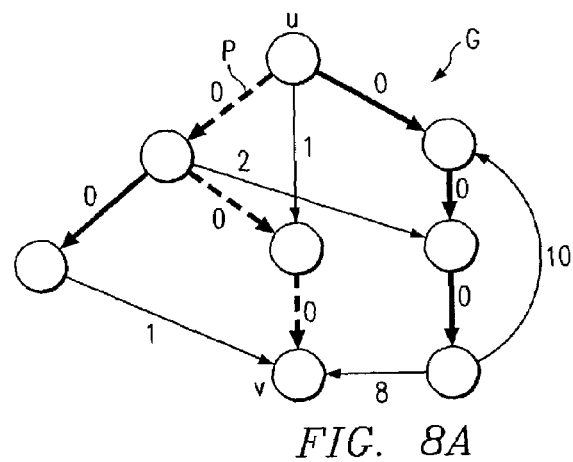
FIGS. 8A-C illustrate block diagrams for determining a pair of edge-disjoint paths total length is as small as possible.
Figure 8B:
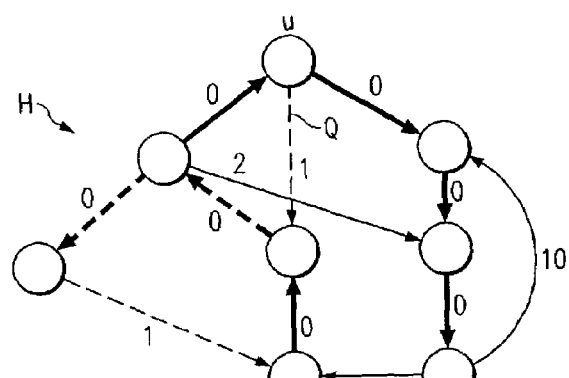
Figure 8C:
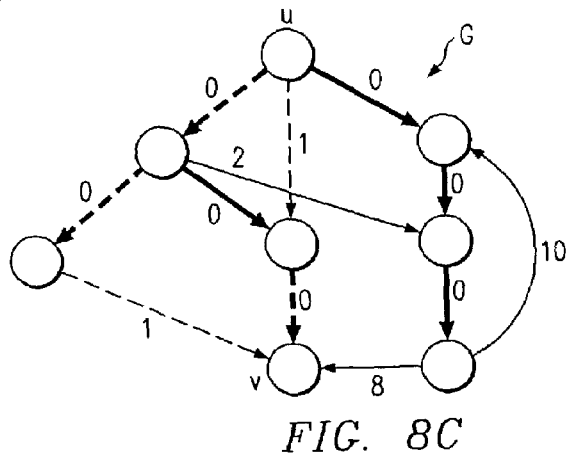

FIGS. 8A-C show how the solution to the first problem is obtained. Use Dijkstra's algorithm to compute a shortest-path tree T in G rooted at u. If T does not contain v, then exit and report that there is no path from u to v in G. For each node x in G, let d(x) be the length of the shortest path from u to x. Change the lengths of the edges. If e is an edge from node x to node y and its original length is l(e), then its new length is l'(e)=l(e)+d(x)−d(y). This adjustment does not change any of the shortest paths from u, so that T is still a shortest-path tree in the adjusted digraph. In fact, all the edges in T will have new length zero. Let P be the unique path from u to v in T and let H be the digraph that is identical to G except that the direction of the edges in P are reversed. Use Dijkstra's algorithm to find a shortest path Q from u to v in H. If there is no path from u to v in H, then exit and report that there is no pair of edge-disjoint paths from u to v in G. Discard all edges in P whose reversals are in Q and discard all edges in Q whose reversals are in P. The remaining edges of P and Q will collectively form two edge-disjoint paths from u to v in G. To construct these paths explicitly, we begin by following P one edge at a time. If at some point we cannot proceed because the next edge has been discarded from P, then there must be an edge in Q emanating from the current node. So we switch over to following edges in Q and, if we run into a discarded edge, we switch back to P and so on. Return these paths.

Using the weighted digraph G of FIG. 6, the result of finding the shortest-path tree is already illustrated therein. FIG. 8A shows the result of changing the lengths of the edges. The shortest path P from u to v is indicated by dashed lines. For instance, the new length of the curved edge is 3+9−2=10. FIG. 8B shows the result of reversing the edges of the shortest path P. The resulting shortest path Q is shown by dashed lines. The shortest path Q contains the reversal of one of the edges of the shortest path P. FIG. 8C shows the result of combining the shortest-path P and the shortest-path Q and eliminating the reversal edges. This yields the desired pair of edge-disjoint paths indicated by dashed lines. Naturally, if the shortest pairs of paths between many pairs of nodes is to be computed, the solution can be run for each pair of nodes. The same warnings about tie-breaking mentioned for Dijkstra's algorithm also apply here.

In the present invention, a novel subroutine labeled as a constrained Dijkstra algorithm is used. As its input, a digraph G has edges e of non-negative weight (or length), a list of edges of digraph G called the rival edges of e, and a distinguished node v of digraph G called the source node. The output is, for each node u of G, the shortest admissible path from v to u. A path p is admissible if, for all edges e in p, no rival edge of e is in p. A partial path P in G is an ordered quadruple (p, l, F, s), where p is a (directed) path in G, l is the length of the path, i.e. the sum of the lengths of its edges, F is a set of edges of G called the forbidden edges of P, and s is the state of the path which takes one of two values: penciled in or inked in. We use the letters p, l and F to denote "coordinate functions," i.e., F(P) is the set of forbidden edges of P, and so on. A partial path $P_1$ is said to dominate a partial path $P_2$ if $l(P_1) \leq l(P_2)$ and $F(P_1) \subseteq F(P_2)$. Intuitively, this means that $P_1$ is at least as good as $P_2$.

During the course of the constrained Dijkstra algorithm, each node u maintains a list of partial paths from v to u. We say that a node is black if there exists an inked-in partial path in its list and we say that it is white otherwise. Initially only v is black. As the constrained Dijkstra algorithm runs, more and more white nodes become black. Once a node becomes black it stays black permanently. If a node u is black, it has at most one inked-in partial path. This represents the shortest admissible path from v to u. If u is white, its penciled-in partial paths represent paths that are potential shortest paths to u. If u is black, its penciled-in partial paths represent initial segments of potential shortest paths to other nodes. Like Dijkstra's algorithm, the constrained Dijkstra algorithm is a breadth-first search subroutine. At each step, one of the nodes u is designated to be the active node and one of the partial paths of u is designated to be the active partial path. Partial paths are extended one node at a time at the active node. Again like Dijkstra's algorithm, the constrained Dijkstra algorithm keeps the partial paths in a heap, so that it can quickly find the shortest partial path when it needs to.

As a pre-processing initialization step, we examine each edge e of G in turn; for each rival edge f of e, we add e to the list of rival edges of f if e is not already on that list. We are free to do this since it does not change the admissibility or length of any path in G and it is convenient for our purposes. The source node's list of partial paths is initialized to contain a single entry P: p(P) is the path consisting solely of the source node v itself, l(P)=0, F(P) is the empty set, and s(P) has the value "inked in." Thus v is black. We also designate v to be the active node and its (unique) partial path to be the active partial path. At every other node the list of partial paths is empty, so they are all white. The partial path P is put on a heap.

During processing, the constrained Dijkstra algorithm probes forward from the active node. That is, suppose that u is the active node and that P is the active partial path. We consider in turn each edge e that emanates from u. If e is forbidden, i.e., if e∈F(P), then we ignore it and move on to the next edge. Otherwise, let w be the node that e points to. We let P' be the partial path obtained from P by appending w to p(P), adding the length of e to l(P), and adding the rival edges of e to F(P). If P' is dominated by some partial path in w's list, then we forget about it and move on to the next edge emanating from u. Otherwise, we add P' to the list of partial paths at w, penciling it in. We also add it to the heap. We then delete any penciled-in partial paths in the list at w that are dominated by P'. These partial paths are also deleted from the heap. We repeat this process until all the edges emanating from u have been exhausted. We then remove P from the heap but do not delete it from the list of partial paths at u. The shortest partial path Q is extracted from the heap and is designated as the new active partial path. A node x is designated as the new active node where the shortest partial path Q is found. The constrained Dijkstra algorithm terminates when either a partial path is extracted from the heap but is empty or when all nodes have been closed, whichever occurs first.

Figure 9A:
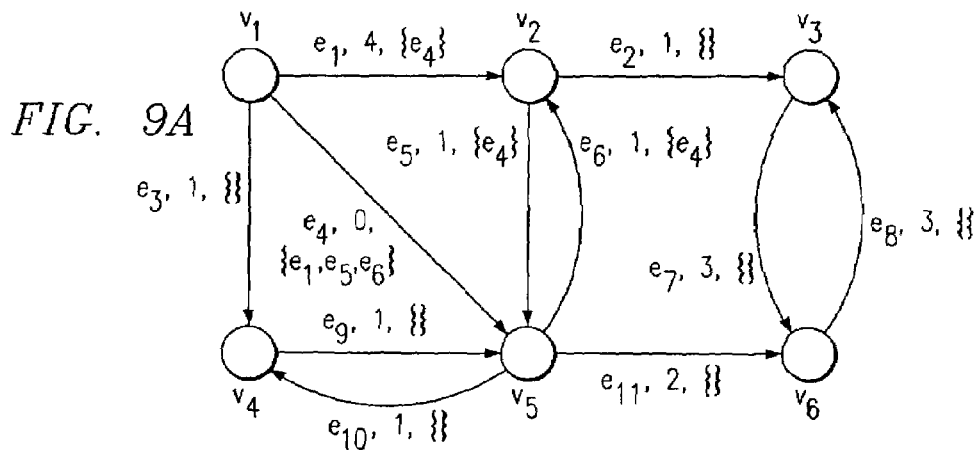
FIGS. 9A-B illustrate block diagrams of an example implementation of the constrained Dijkstra algorithm.
Figure 9B:
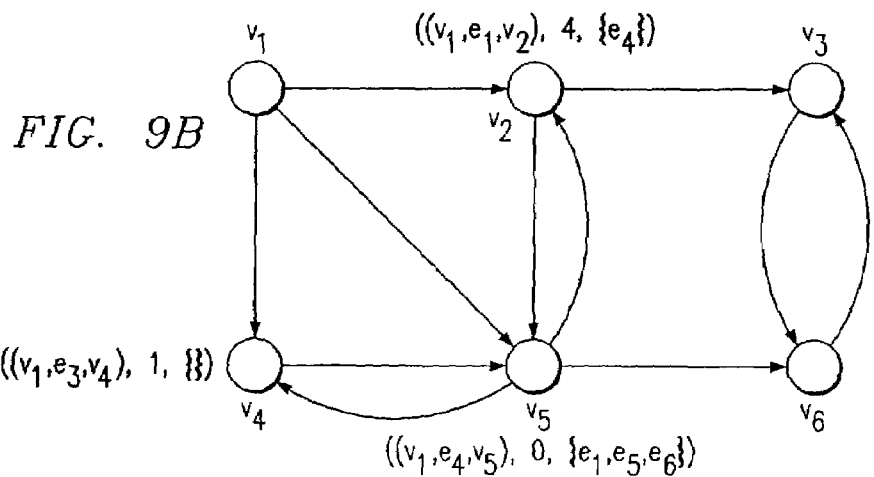

FIGS. 9A-B show an example implementation of the constrained Dijkstra algorithm. In FIG. 9A, digraph G is shown with edges having labels indicating the name of the edge, the length of the edge, and the set of rival edges corresponding thereto. The distinguished node is $v_1$ which is the first closed node blackened in. Observe that if we ignore the constraints given by the rival edges, then the shortest path from $v_1$ to $v_3$ is $(v_1, e_4, v_5, e_6, v_2, e_2, v_3)$. However, this path is not admissible because it contains both $e_4$ and $e_6$, which are rivals of each other. Initially $v_1$ is the active node. In FIG. 9B, if we probe forward then we obtain three partial paths. The partial path at $v_5$ is the shortest so we ink it in, making $v_5$ black. These become the new active partial path and active node.

We now probe forward from $v_5$. At $v_4$, the new partial path is dominated by the existing partial path so it is not added. We cannot probe forward to $v_2$ because $e_6$ is forbidden. Probing forward to $v_6$ is all right and we add a new partial path there: $((v_1, e_4, v_5, e_{11}, v_6), 2, \{e_1, e_5, e_6\})$. This, however, does not become the new active partial path, because the penciled-in partial path at $v_4$ is shorter. We ink in the partial path at $v_4$, make $v_4$ black, and probe forward from $v_4$. The only new partial path created at this stage is at $v_5$: $((v_1, e_3, v_4, e_9, v_5), 1, \{\ \})$. Even though $v_5$ is black, we retain this new partial path because it is not dominated by the existing partial path at $v_5$. The existing partial path is shorter but has forbidden edges that are not forbidden in the new partial path. In fact this becomes the new active partial path, although we do not ink it in because $v_5$ is already black. Continuing in this way, we find that the remaining shortest admissible paths are $(v_1, e_3, v_4, e_9, v_5, e_6, v_2)$, $(v_1, e_3, v_4, e_9, v_5, e_6, v_2, e_2, v_3)$, and $(v_1, e_4, v_5, e_{11}, v_6)$. Notice that these paths do not arrange themselves into a tree; this is one difference from Dijkstra's algorithm.

The running time of the constrained Dijkstra algorithm is exponential in the worst case. As an example of this, consider the "grid graph" $G_n$ whose nodes are the points in the plane whose coordinates are integers with absolute value at most n. Give each edge of $G_n$ one rival edge, namely its image under reflection in the line x+y=0. It is not hard to show that if the node with coordinates (n, n) is the source node, then by the time the constrained Dijkstra algorithm first reaches the line x+y=0 it will be keeping track of about $2^n$ partial paths. Because of this potentially exponential consumption of resources, it is important that the actual implementation of the constrained Dijkstra algorithm contain parameters that allow the constrained Dijkstra algorithm to exit gracefully and report failure if it exceeds a certain amount of time or memory. In practice, however, the constrained Dijkstra algorithm runs fast on the examples that arise in the subroutines.

If two demands between the same terminal nodes use the same (shortest) path, then they cannot share protection paths. Distributing the demands across different paths is therefore more conducive to sharing. A form of load balancing is performed to achieve such a balanced distribution. Initially, a problem called the budget-constrained minimum-cost-path problem is described. For inputs, there are a digraph G whose edges has a cost c(e) and a length l(e), two distinguished nodes s (the source node) and d (the destination node) of G, and a number D being the distance budget. As an output, a path P from s to d is obtained of minimum cost with respect to the costs c(e) among all paths that satisfy the budget constraint $\Sigma_{e \in P} l(e) \leq D$, or else a report that no such path exists.

The budget-constrained minimum-cost-path problem reduces to an ordinary minimum-cost-path problem as follows. Let V be the set of nodes of G and let n be the number of nodes in V. Construct an auxiliary digraph H whose nodes are all the ordered pairs (u, i) such that u∈V and i is an integer between 0 and D inclusive. In particular, H has n·(D+1) nodes. There is an edge in H from (u, i) to (v, i+1) if u=v and $0 \leq i \leq D$; the cost of such an edge is zero. There is also an edge in H from (u, i) to (v, j) if there is an edge e from u to v in G and i+l(e)=j; the cost of such an edge is c(e). It is now not hard to show that the desired budget-constrained minimum-cost path in G can be obtained by finding the (ordinary) minimum-cost path in H from (s, 0) to (d, D) and converting this to a path in G by discarding the length coordinate.

Figure 10A:
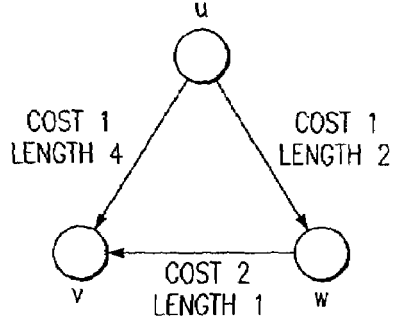
FIGS. 10A-B illustrate block diagrams for providing a budget-constrained minimum-cost-path determination.
Figure 10B:
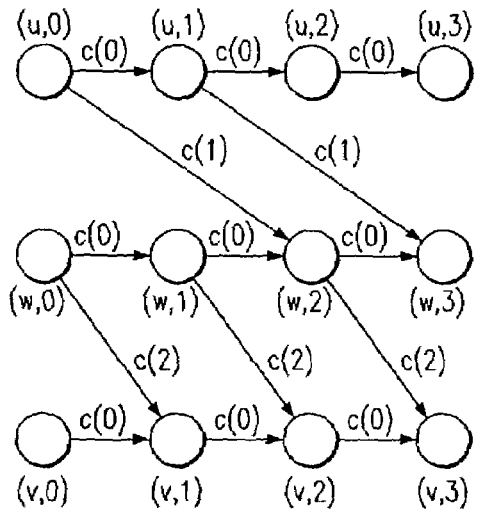

FIGS. 10A-B provide an example of this determination. FIG. 10A shows a digraph G with distance budget D=3. Node u is the source and node v is the destination. FIG. 10B shows the auxiliary digraph H with costs. There is just one path from (u, 0) to (v, 3). It has cost 3 and uses the full distance budget D=3. The direct route from u to v in the original graph does not even appear in H because it exceeds the distance budget. One weakness here is that the number of nodes in H is proportional to the distance budget. If the distance budget is large, then running Dijkstra's algorithm on H will consume a lot of time and memory. If an exact solution is not needed but only an approximation, then this weakness can be circumvented by first dividing all the lengths and the distance budget by some constant scale factor and then rounding up to the nearest integer. For example, this might be chosen if D>5 using the scale factor D/5, thereby ensuring that the distance budget never exceeds 5.

A way of finding a path, the load balanced path, from a given source node s to a given destination node d in a digraph G that takes into account the existing usage of the links in G will now be described. To apply the method, each edge e in G must have both a length L(e) and a usage fraction U(e). The usage fraction should be thought of as the percentage of the capacity of the edge that is used for existing working or protection paths. Let L be the length of the shortest path from s to d in G. The load-balanced path from s to d is defined to be the budget-constrained minimum-cost path from s to d, where the cost of edge e is $2^{U(e)}$, the length of edge e is L(e), and the distance budget is 2L. In other words, an edge whose capacity is almost exhausted costs almost twice as much as a totally unused edge, and the length of the load-balanced path is never allowed to exceed twice the length of the shortest path. The decision to make the cost $2^{U(e)}$ and the distance budget 2D, rather than $\lambda^{U(e)}$ and μL respectively for some other constants λ and μ, was made on heuristic grounds. Different values of λ and μ may also be used.

One reason the switch completion time of SONET BLSR protection is fast is that the link connections of the protection path are pre-cross-connected if there is no extra traffic. In contrast, pre-cross-connection of all protection paths is not always possible in a mesh protection scheme, because a mesh protection scheme may contain branch points. The PXT algorithm is a mesh protection scheme that avoids all branch points and thereby permits switch completion times that are comparable to that of SONET BLSR. The PXT algorithm has precursors, notably the p-cycle technique, but it involves several new and novel ideas.

A cross-connection table indicates how to link up various edges with each other. The matching condition forces the edges to link up into a disjoint union of trails some of which may be closed trails. This motivates the following crucial definition. Given a cross-connection table for a logical graph, a pre-cross-connected trail or PXT is defined to be a trail $(v_0, e_1, v_1, e_2, v_2, \ldots, v_{n-1}, e_n, v_n)$ such that for all i from 1 to n−1, the connection between $e_i$ and $e_{i+1}$ is either intact or pre-cross-connected and such that either (a) $v_0 = v_n$ and the connection between $e_n$ and $e_1$ is intact or pre-cross-connected or (b) $e_1$ is not connected to any edge at $v_0$ and $e_n$ is not connected to any edge at $v_n$. If case (a) holds, then the PXT is said to be a closed PXT. Note that a PXT may fail to qualify as being closed even if $v_0 = v_n$. The importance of the PXT concept is that if a mesh protection path is a subtrail of a PXT, then its switch completion time will be fast. The goal of the PXT algorithm is to ensure that this happens for all mesh protection paths.

Figure 11:
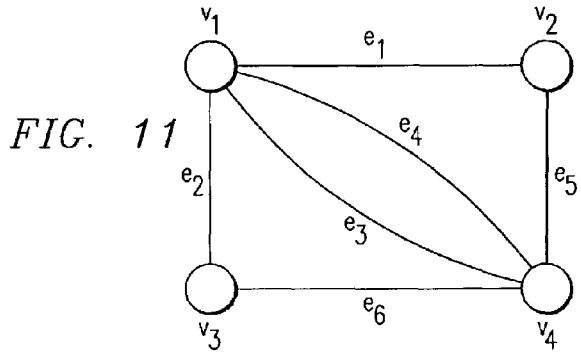
FIG. 11 illustrates a block diagram of an example of a pre-cross-connected trail.

FIG. 11 shows an example of a PXT. A logical graph is illustrated with all edges being OC-48. Suppose that there is an associated cross-connection table in which the connections between the following pairs of edges are either intact or pre-cross-connected: $(e_2, e_6), (e_3, e_6), (e_1, e_3), (e_1, e_5), (e_4, e_5)$. Then there is just one PXT in this graph, namely $(v_1, e_2, v_3, e_6, v_4, e_3, v_1, e_1, v_2, e_5, v_4, e_4, v_1)$. This is not a closed PXT. If however the edges $e_2$ and $e_4$ were connected, then this would be a closed PXT. As another example, suppose that there were no intact connections and no pre-cross-connected connections at all in the cross-connection table, Then there would be six PXT's, each containing a different edge.

It becomes also beneficial to initially determine whether an allocation plan is pre-cross-connectable. For a given network X=(G, H, S, A, T), denote S* the set S with extra traffic demands deleted and denote A* as the allocation plan restricted to S*. Allocation plan A is a pre-cross-connectable allocation plan if there exists a feasible cross-connection table consistent with A* such that every mesh protection path is a subtrail of a PXT. For example, the allocation plan associated with FIGS. 5A-C is not pre-cross-connectable. Note that with the given cross-connection table, $(v_1, e_6, v_3, e_{17}, v_6)$ and $(v_5, e_{18}, v_6, e_{22}, v_7)$ are PXT's, and for example the mesh protection path $(v_1, e_6, v_3, e_{17}, v_6, e_{18}, v_5)$ is not a subtrail of either of these PXT's or of any other PXT in the network. However, this observation does not in itself prove that the allocation plan is not pre-cross-connectable. First, the property of being pre-cross-connectable depends on whether there exists a feasible cross-connection table with a certain property. Just because the actual cross-connection table for a network may not be a suitable one does not prove that no other cross-connection table is suitable since in general there are many different cross-connection tables that are consistent with a given allocation plan. Second, the restricted allocation plan A*, i.e. ignore the extra traffic, rather than the full allocation plan A. Therefore $e_{17}$ and $e_{18}$ may be pre-cross-connected if desired. However, even with this extra flexibility, the branch point at $v_6$ is an insurmountable problem no matter what feasible cross-connection table is used. Either the mesh protection path $(v_1, e_6, v_3, e_{17}, v_6, e_{18}, v_5)$ or the mesh protection path $(v_3, e_{17}, v_6, e_{22}, v_7, e_{19}, v_5)$ will fail to be a subtrail of a PXT.

To determine whether a given allocation plan is pre-cross-connectable, an subroutine identified as FINDPXT is implemented. For an input network X, FINDPXT determines a cross-connection table T that is feasible for X restricted to S* though it may not be feasible for X itself if X has extra traffic. FINDPXT constructs T by starting with the minimum connections required for feasibility and then changing certain connections from "not connected" to "pre-cross-connected" one at a time. To state the subroutine precisely we need some definitions. A sharable protection path is a mesh protection path or a span protection path of a traffic demand in S* whose sharing type is 1:N. A sharable protection edge is an edge that appears in some sharable protection path. If e is a sharable protection edge and v is an endnode of e, then an edge e' is an extension of e at v if there exists a sharable protection path containing both e and e'.

Cross-connection table T is determined as follows. At step (i), initialize T by examining A* and making the intact connections demanded by the first feasibility condition required for both an allocation plan and a cross-connection table previously discussed above. All other connections are set to not connected. At step (ii), the initial cross-connection table results in a certain set of PXT's. Let $\pi$ be the subset of these PXT's that consist entirely of sharable protection edges. Pick any PXT $P \in \pi$ and pick one end of it. At step (iii), let v be the last node at the chosen end of P and let e be the last edge at the chosen end of P (so in particular v is an endnode of e). Find all extensions of e at v. If there are no extensions of e at v or if there is more than one extension of e at v, then mark this end of P as dead and skip to step (vi). At step (iv), let e' be the unique extension of e at v. If there exists an extension of e' at v other than e, then mark this end of P as dead and go to step (vi). At step (v), it must be the case that e' is at the end of a PXT $P' \in \pi$. Modify T by making the connection between e and e' pre-cross-connected. This will modify $\pi$ either by merging P and P' into a single PXT or (if P=P') by making P into a closed PXT. At step (vi), find a PXT $P \in \pi$ and pick an end of P that is not dead. If successful, return to step (iii) and repeat. Otherwise, if there is no such P, then terminate FINDPXT. The allocation plan is pre-cross-connectable if and only if in the course of running FINDPXT, there is no more than one extension of an edge at a node. Notice that even when the allocation plan is not pre-cross-connectable, FINDPXT still produces a cross-connection table T.

As an example, the FINDPXT subroutine is applied to the network of FIGS. 5A-C. Step (i) of FINDPXT is straightforward. The set in step (ii) consists of seven PXT's, each containing just one edge: $(v_1, e_6, v_3)$, $(v_3, e_{17}, v_6)$, $(v_5, e_{18}, v_6)$, $(v_6, e_{22}, v_7)$, $(v_5, e_{19}, v_7)$, $(v_2, e_{10}, v_5)$, and $(v_2, e_{11}, v_7)$. In general some of the initial PXT's might contain more than one edge if there are sharable span protection paths since these have mandatory intact connections. At step (iii), take $P=(v_6, e_{22}, v_7)$ and pick the $v_6$ end of P. There is exactly one extension of $e_{22}$ at $v_6$, namely $e_{17}$. Proceed to step (iv) and look for extensions of $e_{17}$ at $v_6$. There are two extensions of $e_{17}$ at $v_6$, namely $e_{22}$ and $e_{18}$, so the $v_6$ end of P is marked as dead. Notice what has happened here: FINDPXT has detected a branch point and therefore refuses to try to extend any PXT's through the branch point. Similarly, if the $v_6$ end of $P=(v_3, e_{17}, v_6)$ is taken, then it will end up being marking dead. Next, returning to step (iii), take $P=(v_1, e_6, v_3)$ and select the $v_3$ end of P. There is exactly one extension of $e_6$ at $v_3$, namely $e_{17}$, and there is exactly one extension of $e_{17}$ at $v_3$, namely $e_6$. Therefore, the process proceeds to step (v) and the connection between $e_6$ and $e_{17}$ is made pre-cross-connected. This merges the two PXT's $(v_1, e_6, v_3)$ and $(v_3, e_{17}, v_6)$. The $v_6$ end remains dead, of course. If the rest of the FINDPXT subroutine is followed, then $(v_2, e_{10}, v_5)$, and $(v_2, e_{11}, v_7)$ merge into a single PXT, as do $(v_6, e_{22}, v_7)$ and $(v_5, e_{19}, v_7)$. Four PXT's are obtained consisting of sharable protection edges. Since two extensions of $e_{17}$ at $v_6$ were found, the allocation plan is not pre-cross-connectable.

In order to allocate a new mesh protection path, the PXT algorithm is performed. In response to a network X=(G, H, S, A, T) such that S has no extra traffic and a traffic demand $d \in S$ that is intra-mesh, mesh protection level of service, sharing type 1:N, and pre-determined working path w(d) and span protection pat s(d), a mesh protection path r(d) and a new cross-connection table T' is obtained or else a report stating that no mesh protection path could be found. In fact, the PXT algorithm finds the mesh protection path that uses as few formerly unused edges as possible, subject to the constraint that none of the edges that were connected in T are not connected in T'. Informally, the idea is to minimize bandwidth usage while retaining pre-cross-connectability.

Initially, a set of paths is obtained from the set of PXTs in cross-connection table T. This is coined subdividing PXTs. PXTs are subdivided by the following steps for a source node u and a destination node v of a demand d. At step (i), omit all PXT's except those consisting entirely of sharable protection edges. At step (ii), omit all PXT's whose capacity does not match that of d. At step (iii), omit all closed PXT's except those that contain at least one occurrence of u and at least one occurrence of v. At step (iv), pick a PXT and find all occurrences of u and v on it. These occurrences subdivide the PXT into subtrails. A subtrail may "wrap around" the end of the PXT if and only if the PXT is a closed PXT. At step (v), Discard any such subtrails that are not paths. At step (vi), if there is an intact connection between the edges in the PXT immediately preceding and following a particular occurrence of u or v, then discard the subtrails immediately preceding and following this occurrence of u or v if they have not already been discarded. At step (vii), if all PXT's have been processed, then terminate. Otherwise go back to step (iv).

After the subdivided paths are determined, further pruning is performed to obtain shortcut paths. The subdivided paths obtained above are potential segments of r(d). Some of them must be disqualified because using them would cause unfeasibility. Specifically, a path P is omitted if it contains an edge e with any of the following properties—(1) e is a forbidden edge of d or one of the endnodes of e is a forbidden node of d, (2) e touches the interior of w(d), (3) e is contained in a mesh protection path of a demand $d' \neq d$ whose working path w(d') is not interior-disjoint from w(d), (4) e∈s(d), and (5) e is already contained in N protection paths, where N is the sharing limit. The paths that remain after this elimination process are the shortcut paths. These shortcut paths are now used to create a graph H* on which the constrained Dijkstra algorithm is run to find r(d).

The nodes of H* are the same as the nodes of H. If $v_1$ and $v_2$ are nodes in H and there exists one or more edges e' in H between $v_1$ and $v_2$ such that e' has the same capacity as d, e' does not appear in any working or protection path of A* or in w(d), and e' does not have any of the properties in the list (a) to (e) just given for shortcut paths, then an edge e is created in H* between $v_1$ and $v_2$. Only one such edge is created in H* between $v_1$ and $v_2$ even if there are many edges e' in H between $v_1$ and $v_2$ with the necessary properties. e is denoted as an unused edge. It has a length equal to that of e'. Additionally, for each shortcut path P, we create an edge in H* of zero length between the endnodes of P. Such edges are denoted as shortcut edges. The only edges in H are the unused edges and shortcut edges just described. To complete the description of H*, rival edges are also specified. Two shortcut edges in H* are rivals of each other if either shortcut path contains an edge that touches the interior of the other shortcut path. Similarly, a shortcut edge s and an unused edge e in H are rivals of each other if e touches the interior of the shortcut path of s. Unused edges in H* are never rivals of each other. This completes the description of H*. The final step is to run the constrained Dijkstra algorithm on H* to find the shortest admissible path in H* between the source and destination of d. By replacing each shortcut edge in H* with its shortcut path in H and each unused edge in H* with a corresponding unused edge in H, we obtain the desired mesh protection path r(d). Finally, the output cross-connection table T' is obtained from T by making any previously not connected cross-connections in r(d) into pre-cross-connected connections.

Figure 12A:
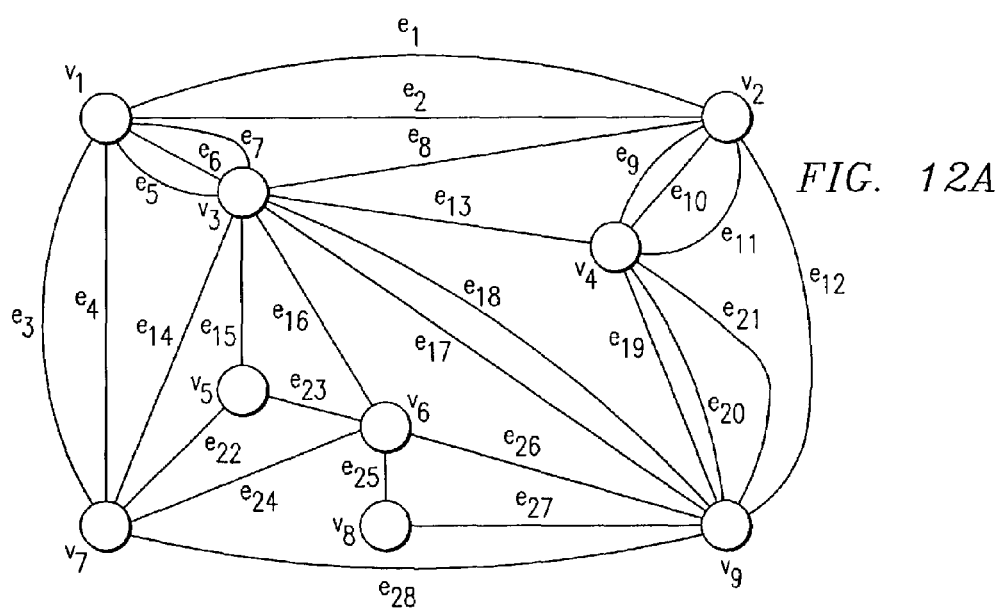
FIGS. 12A-C illustrate block diagrams of an example implementation of the PXT algorithm.
Figure 12B:
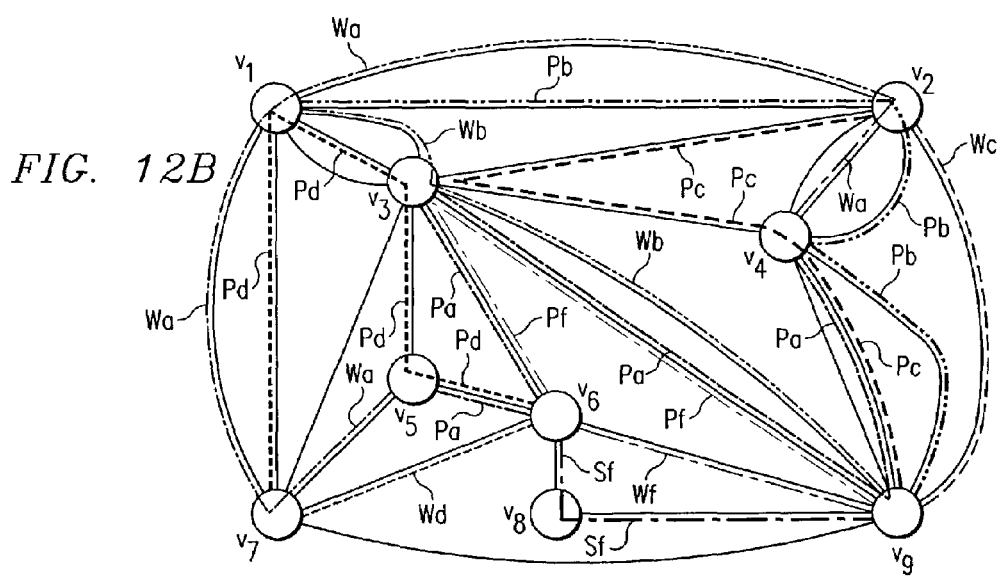
Figure 12C:
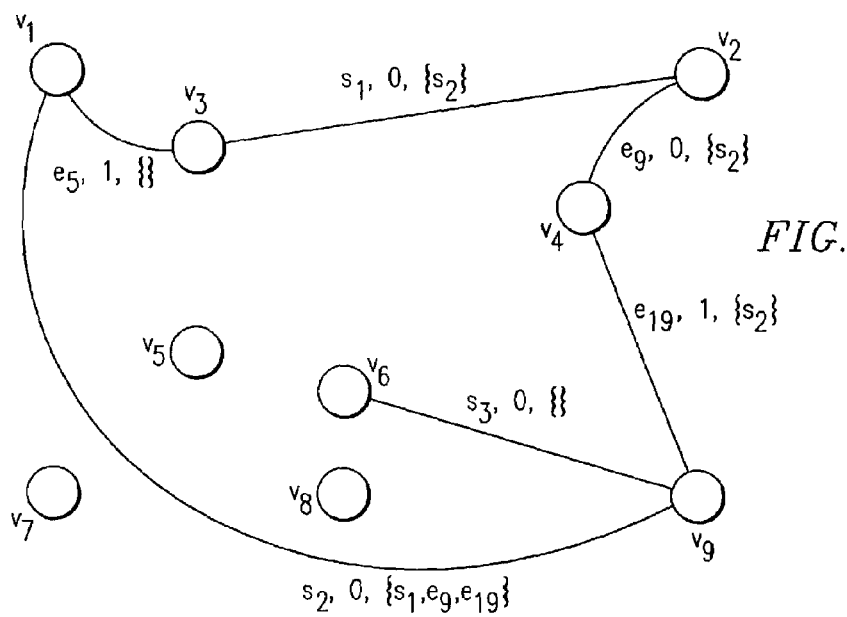

FIGS. 12A-C show an example implementation of the PXT algorithm. FIG. 12A is a logical graph H whose edges all have capacity OC-48 and length of 1. We assume that the sharing limit N has its default value of 16. There are six demands, all intra-mesh with capacity OC-48 and no forbidden nodes or edges. Five of the demands require shared mesh protection only and their source and destination nodes are respectively (1) $v_4$ and $v_5$, (2) $v_1$ and $v_9$, (3) $v_2$ and $v_9$, (4) $v_6$ and $v_7$, and (5) $v_3$ and $v_9$. Demand (6) requires shared span and mesh protection and its source and destination are $v_6$ and $v_9$. No muxing is done. The routings of all the demands except demand (5) are shown in FIG. 12B. The conventions described with respect to the sample network of FIGS. 5A-C also apply here.

If FINDPXT is run on this network (with demand (5) omitted), then the sharable protection edges arrange themselves into three PXT's.

PXT1: $(v_7, e_4, v_1, e_6, v_3, e_{15}, v_5, e_{23}, v_6, e_{16}, v_3, e_{17}, v_9, e_{20}, v_4, e_{13}, v_3, e_8, v_2)$

PXT2: $(v_1, e_2, v_2, e_{11}, v_4, e_{21}, v_9)$

PXT3: $(v_6, e_{25}, v_8, e_{27}, v_9)$

The connection between $e_{16}$ and $e_{17}$ is intact, because of the span protection path of demand (6). The remaining connections between consecutive edges in these PXT's are pre-cross-connected.

Suppose now that by some means that the working path of demand (5) has been determined to be $(v_3, e_{14}, v_7, e_{28}, v_9)$. We now use the PXT algorithm to find a mesh protection path. The first step is to subdivide the PXT's. PXT2 and PXT3 are unchanged, but PXT1 is subdivided into five subtrails: $(v_7, e_4, v_1, e_6, v_3)$, $(v_3, e_{15}, v_5, e_{23}, v_6, e_{16}, v_3)$, $(v_3, e_{17}, v_9)$, $(v_9, e_{20}, v_4, e_{13}, v_3)$, $(v_3, e_8, v_2)$. The second subtrail is discarded because it is not a path. The third subtrail is discarded because of the intact connection between $e_{16}$ and $e_{17}$. The remaining three subtrails, together with PXT2 and PXT3, comprise five paths. This is the output of the subdivision stage of the PXT algorithm.

Next, this set of paths undergoes the elimination process to identify shortcut paths. The path $(v_7, e_4, v_1, e_6, v_3)$ is eliminated because it contains the edge $e_4$, which touches the interior of the working path $(v_3, e_{14}, v_7, e_{28}, v_9)$. The path $(v_9, e_{20}, v_4, e_{13}, v_3)$ is eliminated because it contains the edge $e_{20}$, which is contained in the mesh protection path of demand (1) whose working path is not interior-disjoint from the working path $(v_3, e_{14}, v_7, e_{28}, v_9)$. This leaves us with three shortcut paths that survive the elimination process: $(v_3, e_8, v_2)$, $(v_1, e_2, v_2, e_{11}, v_4, e_{21}, v_9)$, and $(v_6, e_{25}, v_8, e_{27}, v_9)$. With the new definition of "interior-disjoint," the second of these shortcut paths would also be eliminated, because the working paths of demands (2) and (6) are not interior-disjoint.

The next step is the construction of the auxiliary graph H*. FIG. 12C shows the auxiliary graph H*. There is an unused edge of length 1 between each of the following pairs of nodes: $\{v_1, v_3\}$, $\{v_2, v_4\}$, and $\{v_4, v_9\}$. For convenience, the names $e_5$, $e_9$, and $e_{19}$ are continued to be used for these edges. There is a shortcut edge, denoted $s_1$, between $v_2$ and $v_3$, a shortcut edge, denoted $s_2$, between $v_1$ and $v_9$, and a shortcut edge, denoted $s_3$, between $v_6$ and $v_9$. The shortcut path $(v_3, e_8, v_2)$ contains the edge $e_8$ which touches the interior of $s_2$ and the unused edges $e_9$ and $e_{19}$ also touch the interior of $s_2$. Using the constrained Dijkstra algorithm, the shortest admissible path from $v_3$ to $v_9$ is $(v_3, e_5, v_1, s_2, v_9)$. This corresponds to the path $(v_3, e_5, v_1, e_2, v_2, e_{11}, v_4, e_{21}, v_9)$ in the original graph H. Observe that if the other admissible path from $v_3$ to $v_9$ in H* had been chosen, then a shorter mesh protection path would have been obtained but it would have used two previously unused edges instead of just one. The path chosen by the PXT algorithm maximizes sharing. The final step is the cross-connection table update. The only change in this example is that a pre-cross-connected connection is formed between $e_5$ and $e_2$, extending PXT2 by one edge.

A higher level subroutine, ROUTEDEMAND, may be used to determine a routing for a demand d from a network X=(G, H, S, A, T), a traffic demand d∈S, and a secondary cross-connection table T*. T* must have the property that if all extra traffic is deleted from X, then replacing T with T* results in a feasible network. Consistent with its name, ROUTEDEMAND does no muxing. The behavior of ROUTEDEMAND varies depending on the properties of d. The general pattern is that ROUTEDEMAND first tries a primary routing method. If the primary routing method succeeds, then its results are used. If it fails, ROUTEDEMAND next tries a secondary routing method. If the secondary routing method succeeds, then its results are used. If the secondary routing method also fails, then ROUTEDEMAND reports a failure and moves on.

Figure 13:
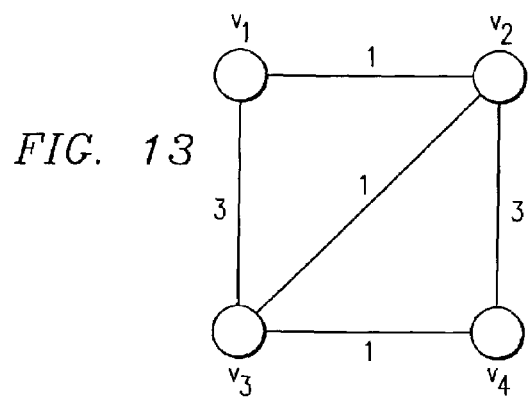
FIG. 13 illustrates a block diagram of why primary and a secondary routing methods are used.

FIG. 13 shows why a primary and a secondary routing method are used. The edge labels shown are lengths. Typically, a primary routing method proceed by finding a working path first using some kind of shortest-path subroutine and then using some other subroutine to find a protection path that is interior-disjoint from the working path. The shortest path from $v_1$ to $v_4$ is the Z-shaped path passing through $v_2$ and $v_3$. If this is chosen as the working path, then it is impossible to find a protection path that is interior-disjoint from it, no matter how much capacity one adds to the edges. On the other hand, if there were indeed plenty of capacity, it would not be very satisfactory for a routing method to report that it could not route any demands between $v_1$ and $v_4$ since it is obvious that by using the perimeter of the square instead of the Z-shaped path two interior-disjoint paths between $v_1$ and $v_4$ can be found. A secondary routing method can avoid these kinds of embarrassments by finding the working and protection paths simultaneously. Secondary routing methods are carefully designed so that as long as there are plenty of unused edges on every link a routing for the given demand can be found unless the graph has so few links that disjoint paths between the terminal nodes do not even exist. It is difficult to create a single routing method that guarantees that a routing will be found while simultaneously achieving high bandwidth efficiency. Therefore, it is preferable to try the efficient primary routing method first and to fall back on the guaranteed but inefficient secondary routing method only if the primary method fails.

Figure 14A:
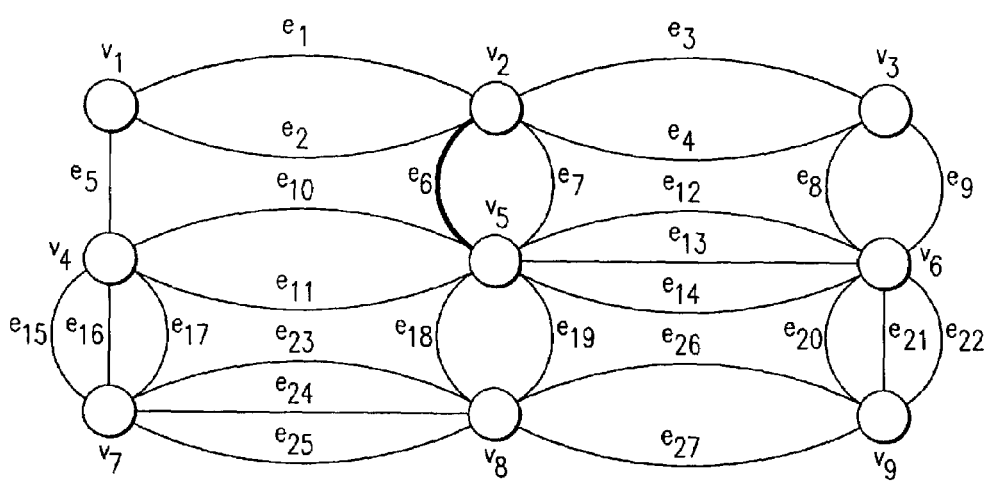
FIGS. 14A-B illustrate block diagrams of an example of a routing for a demand using the ROUTEDEMAND subroutine.
Figure 14B:
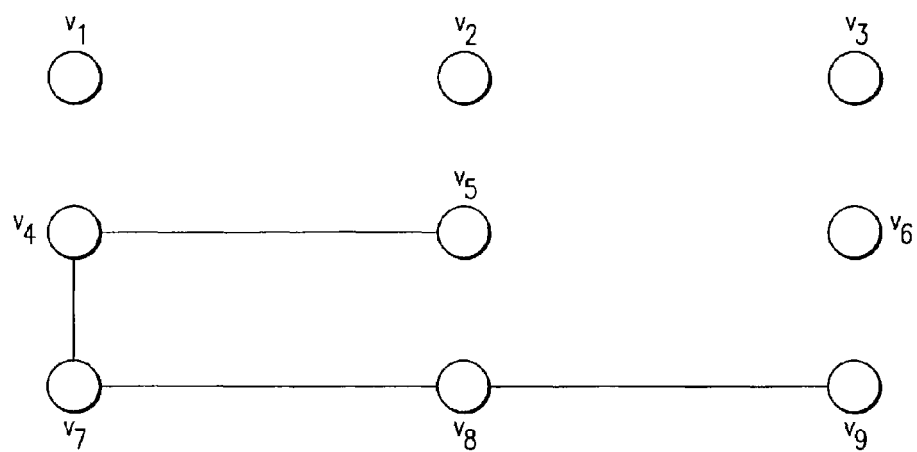

FIGS. 14A-B provide an example of a routing for a demand using ROUTEDEMAND. A variety of subgraphs of H are used and identified as $H_n[P|P_1, P_2, \ldots, P_k]$, where n=1 or 2 and P, $P_1, P_2, \ldots, P_k$ are paths in H. The nodes of this subgraph are the nodes of H minus the nodes that are in the list of forbidden nodes of d and also minus the nodes in the interior of P. If P is only one link long then there are no edges in the subgraph between the endnodes of P. Apart from this exceptional case, there is an edge in the subgraph between u and v if and only if there are at least n unused edges in H between u and v that have the same capacity as d and that are not in the list of forbidden edges of d, where "unused" here means that it is not used by any demands in S nor by any of the paths $P_1, P_2, \ldots, P_k$. Note that $H_n[P|P_1, P_2, \ldots, P_k]$ never has multiple edges. This is important, as mentioned earlier, because it implies that the Suurballe-Tarjan disjoint-pair algorithm, which a priori finds paths that are only node-disjoint, will in fact find paths that are interior-disjoint. Some or all paths are sometimes omitted from the notation, e.g., $H_n[|P_1, P_2, \ldots, P_k]$, $H_n[P|]$, or $H_n$. To interpret this, simply omit all clauses from the definition that refer to the omitted paths. So, for example, $H_1$ is the subgraph that has an edge between two (non-forbidden) nodes u and v if there exists at least one non-forbidden unused edge in H between u and v with the same capacity as d. In FIG. 14A, the thick line shown is an OC-192 edge; the remaining lines are OC-48 edges. It is assumed that there are no demands in the network other than the demand d that we want to route. It is also assumed that d is an OC-48 demand with forbidden edge $.e_1$ and forbidden node $v_3$. The remaining properties of d are irrelevant for this example. Let $P_1$ be the path $(v_5, e_{18}, v_8, e_{23}, v_7)$. If P is the path $(v_5, e_{12}, v_6, e_{21}, v_9)$, then $H_2[P|P_1]$ is as shown in FIG. 14B. Node $v_3$ is omitted because it is forbidden and node $v_6$ is omitted because it is an interior node of P. All edges incident to these omitted nodes disappear along with the nodes. Then, on each link, a determination is made as to whether there are at least two edges remaining in H after we disregard (a) edges used by existing demands (of which there are none here), (b) forbidden edges of d (i.e., $e_1$), (c) edges of the wrong capacity (i.e., $e_6$), and (d) edges in $P_1$. If so, then we have an edge in $H_2[P|P_1]$. As another example, if we were to redefine P to be the path $(v_6, e_{21}, v_9)$ (without redefining $P_1$), then $H_2[P|P_1]$ would be the same except that $v_6$ would be present and there would be an edge between $v_5$ and $v_6$. There would, however, be no edge between $v_6$ and $v_9$.

If dedicated protection is required then the secondary cross-connection table T* is ignored. If d is an intra-mesh demand requiring dedicated mesh and span protection, then the primary routing method begins by using Dijkstra's algorithm to find a path between the source and destination of d in $H_2$. Both w(d) and s(d) are co-routed along this path, each using a different unused edge in H on each link along the way. ROUTEDEMAND then uses Dijkstra's algorithm on $H_1[w(d)|]$ to find r(d). The secondary routing method uses the Suurballe-Tarjan disjoint-pairs algorithm on $H_1$, using one of these paths for w(d) and s(d), if there is enough spare capacity, and the other path for r(d). If d is an intra-mesh demand requiring dedicated mesh protection only, then the primary routing method uses the shortest-pair subroutine to find interior-disjoint paths in $H_1$ between the source and the destination of d. The shorter of these paths is designated w(d) and the other path is designated r(d) If both paths are of equal length then either one may be designated w(d). There is no secondary routing method performed. If d is an inter-mesh demand requiring dedicated mesh protection only, then the primary routing method uses the shortest-pairs subroutine to find interior-disjoint paths in $H_1$ from the access node to each of the homing nodes. These are used for the working paths $w_1(d)$ and $w_2(d)$. Next, Dijkstra's algorithm is used on $H_1[w_1(d)|w_2(d)]$ to find $r_1(d)$. Finally, to find $r_2(d)$, Dijkstra's algorithm is used on $H_1[w_2(d)|w_1(d), r_1(d)]$.

Figure 15A:
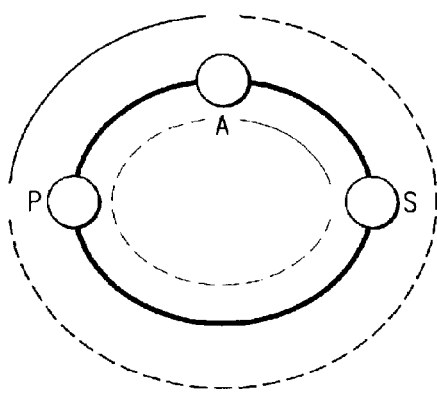
FIGS. 15A-D illustrate block diagrams of the secondary routing method for inter-mesh demands requiring dedicated mesh protection only.
Figure 15B:
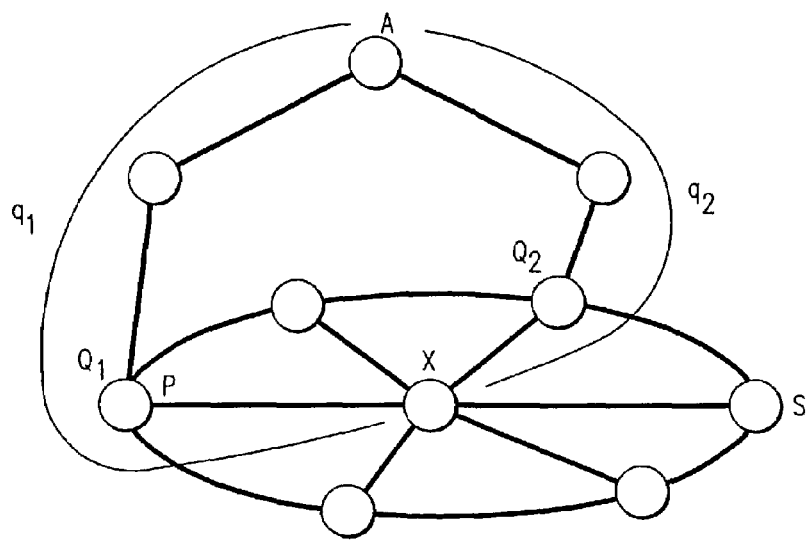
Figure 15C:
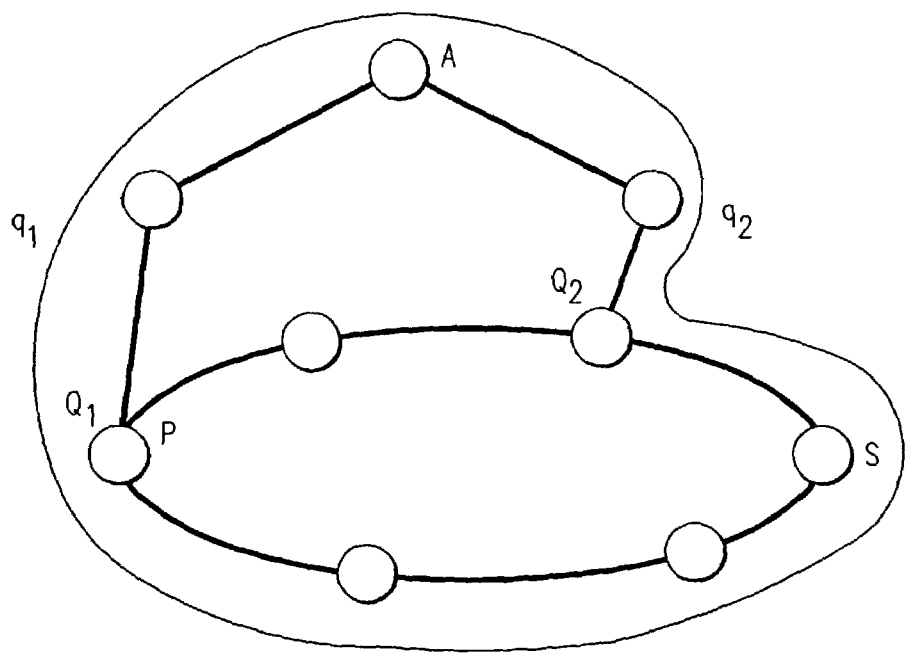
Figure 15D:
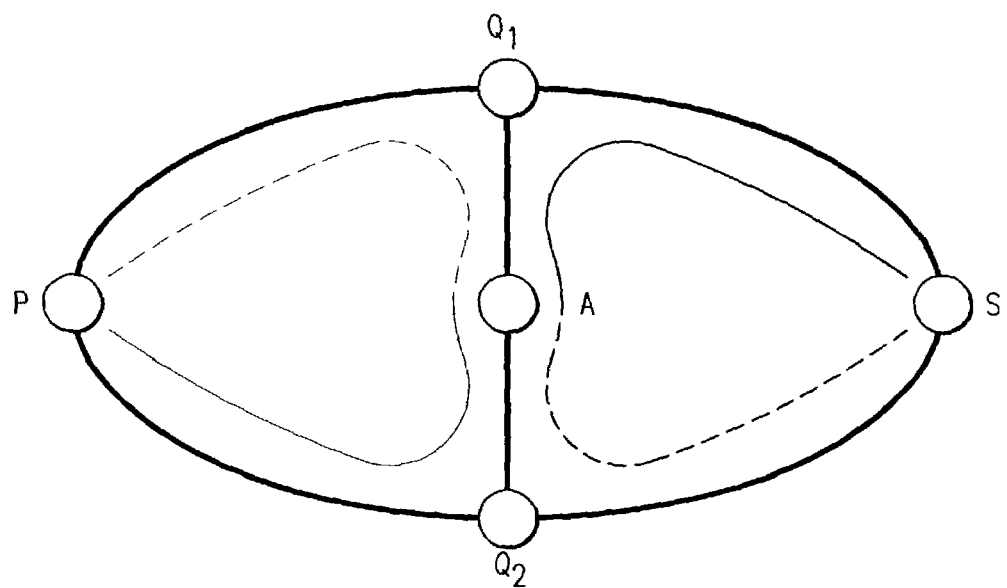

FIGS. 15A-D show the secondary routing method for inter-mesh demands requiring dedicated mesh protection only. This is quite complicated since it is not so simple to guarantee that a feasible routing will be found. Let A denote the access node, P denote the primary homing node, and S denote the secondary homing node. At step (i), use the Suurballe-Tarjan disjoint-pair algorithm to find a pair of interior-disjoint paths $p_1$ and $p_2$ in $H_2$ between P and S. Together, these paths form a cycle, i.e. a closed trail with no repeated nodes, denoted as c. If $p_1$ and $p_2$ cannot be found, then use the Suurballe-Tarjan disjoint-pair algorithm to find a pair of interior-disjoint paths in $H_1$ between A and P, and use the Suurballe-Tarjan disjoint-pair algorithm to find a pair of interior-disjoint paths in $H_1$ between A and S. Use these for the required working and protection paths. If in either case the Suurballe-Tarjan disjoint-pair algorithm fails to find the desired pair of paths, then the secondary routing method reports failure and exits. At step (iii), if the cycle c contains A, then we may route the working and protection paths as shown in FIG. 15A. At step (iv), if c does not contain A, then a node X is temporarily added to $H_2$ and connected to every node in c with zero-length edges. The Suurballe-Tarjan disjoint-pairs algorithm is used to find a pair of interior-disjoint paths $q_1$ and $q_2$ between A and X as shown in FIG. 15B. If no such paths can be found then the secondary routing method reports failure and exits. Each of $q_1$ and $q_2$ intersects the cycle c in exactly one node; denoted as nodes $Q_1$ and $Q_2$ respectively. Note that one or both of $Q_1$ and $Q_2$ may, but need not, coincide with P or S. At step (v), delete the temporary node X and its incident zero-length edges to obtain the routing diagram of FIG. 15C. At step (vi), if $Q_1$ and $Q_2$ both lie on $p_1$, then the paths $q_1$ and $q_2$ minus the deleted temporary zero-length edges, together with the arc of c containing $Q_1, Q_2$, P, and S, form a cycle in $H_2$ containing A, P, and S. The routing method described in step (iii) above may be used using this cycle. Similarly, if $Q_1$ and $Q_2$ both lie on $p_2$, the method is done. At step (vii), if $Q_1$ and $Q_2$ do not both lie on $p_1$ and do not both lie on $p_2$, the result is use of the routing diagram shown in FIG. 15D.

For an intra-mesh demand that requires shared protection, the primary routing method begins by finding the working path using load balancing. More precisely, it constructs an auxiliary load-balancing graph L as follows. The nodes of L are the nodes of H, excluding the forbidden nodes of d. There is an edge in L between two nodes and only if there is at least one non-forbidden unused edge in H between those nodes that has the same capacity as d. Up to this point L is the same as $H_1$. Each edge in L has a length and a usage fraction. The length of an edge is the same as the length of the corresponding edge in H. The usage fraction is the number of used edges, i.e. used by some other working or protection path, in H on this link with the same capacity as d divided by the total number of edges in H on this link with the same capacity as d. Forbidden edges of d are used in the calculation of the usage fraction. Then the load-balanced path in L between the source and destination of d is used for the working path w(d) of d.

Next, if d requires span protection, then the primary routing method continues by checking if any existing demands with sharing type 1:N whose working path is co-routed with w(d) has a span protection path that may be shared with d, i.e. the span protection path contains no forbidden nodes or edges of d and has not reached the sharing limit N. If so, the primary routing method chooses one such path to be s(d). If not, then it constructs s(d) by allocating one unused edge if such an edge exists on each link that w(d) traverses.

The final step of the primary routing method is to invoke the PXT algorithm to find the mesh protection path. Let $X_1$ be the network X with extra traffic deleted and with T * instead of T. ROUTEDEMAND passes $X_1$ and d, along with w(d) and, if span protection is required, s(d) to the PXT algorithm. The mesh protection path r(d) found by the PXT algorithm is combined with w(d) and, if span protection is required, s(d) to form the output of ROUTEDEMAND. Notice that ROUTEDEMAND outputs only a routing. The cross-connection table returned by the PXT algorithm is discarded. The secondary routing method simply uses the Suurballe-Tarjan disjoint-pair algorithm on $H_1$. If a span protection path is required, it is co-routed with the working path.

For an inter-mesh demand, the primary routing method begins by using the Suurballe-Tarjan disjoint-pair algorithm on $H_1$ to find working paths $w_1(d)$ and $w_2(d)$. ROUTEDEMAND cannot invoke the PXT algorithm directly to compute the mesh protection paths since the PXT algorithm expects an intra-mesh demand as input. So, roughly speaking, ROUTEDEMAND "breaks" d into two intra-mesh demands $d_1$ and $d_2$, that are destined for the primary and secondary homing nodes respectively and routes $d_1$ and $d_2$ one after the other. More precisely, ROUTEDEMAND passes $X_1|w_2(d)]$, that is the graph $X_1$ minus the edges used by $w_2(d)$, and $d_1$ along with $w_1(d)$ to the PXT algorithm. The PXT algorithm finds a mesh protection path for $d_1$ and also returns a new cross-connection table T'. This gives an allocation plan for $d_1$ where no muxing is done. ROUTEDEMAND now calls the PXT algorithm again, this time with $X_2$ and $d_2$, where $X_2$ is the network whose allocation plan is A, updated to include the allocation plan for $d_1$, and whose cross-connection table is T'. Finally, ROUTEDEMAND combines the information from the two calls to the PXT algorithm into a routing for d. Note that although ROUTEDEMAND does not output a cross-connection table, it must keep track of the cross-connection table from the first call to the PXT algorithm so the second call to the PXT algorithm will be consistent with the results of the first call. The secondary routing method for inter-mesh demands is the same as that described for inter-mesh demands with dedicated protection.

For unprotected demands, the secondary cross-connection table T * is ignored. Non-preemptible unprotected traffic is the easiest type of demand to route: ROUTEDEMAND simply uses Dijkstra's algorithm (for intra-mesh) or shortest-pair (for inter-mesh) to find a working path in $H_1$. It might seem that extra traffic would be equally easy to route as protection edges would be used rather than unused edges. However, there is a complication because span protection paths have mandatory intact connections. Assuming that the user will not use dual homing for extra traffic; the discussion below is confined to intra-mesh demands d. ROUTEDEMAND constructs a graph H* as follows. The nodes of H* are the nodes of H minus the forbidden nodes of d. Each edge e in H with the same capacity as d is carried over to H* as long as e is not a forbidden edge of d, e lies in the mesh protection path of some existing demand with shared protection, and e is not already used by some other extra traffic. These edges are called the ordinary edges of H*. Span protection paths are handled similarly to shortcut paths in the PXT algorithm. Any span protection paths that belong to demands with dedicated protection, that contain a forbidden edge or node of d, that are already used by some other extra traffic, or that contain either the source or the destination of d as an interior node are ignored. For each remaining span protection path P, we introduce a shortcut edge e∈H*, whose endnodes are the endnodes of P and whose length is the length of P. Two shortcut edges are rivals if either one contains an edge that touches the interior of the span protection path of the other. A shortcut edge and an ordinary edge are rivals if the ordinary edge touches the interior of the span protection path. To find w(d) we now run the constrained Dijkstra algorithm on H*.

An overview description of the allocation algorithm is now provided. The allocation algorithm is essentially an online algorithm where demands are allocated one at a time and previous allocations chosen for previous demands are not modified. However, the entire set of demands may be examined when determining an order in which demands are processed. More specifically, each demand is associated the following vector: [sharing type, level of service, capacity, inter-/intra-mesh]. The demands are then ordered lexicographically according to this vector. That is, to determine which of two given demands should come first on the list, their vectors are scanned to find the first coordinate in which they disagree and the demand with the higher value takes priority. For the purposes of this construction, inter-mesh is considered to be higher than intra-mesh and extra traffic and non-preemptible unprotected traffic are considered to have sharing type 1:N. For example, an OC-48 demand requiring 1:N mesh and span protection will come before an unprotected OC-192 demand, after an OC-48 requiring 1+1 mesh protection only, and after an OC-192 demand requiring 1:N mesh and span protection. This will be true regardless of which of these demands are inter-mesh or intra-mesh. There will often be demands whose vectors are identical. If this is the case, then an arbitrary, but deterministic, tie-breaking rule is used. Alternatively, if there is enough computer time available, the user may invoke the option of running the allocation algorithm several times, each time with ties broken according to a random number generator. The allocation algorithm will then select the best of these random trials.

The allocation algorithm begins with the input network X and runs FINDPXT to determine a cross-connection table T * that is feasible for X with extra traffic deleted. Next, the original cross-connection table T is modified as follows. First, it is set to be equal to T *. Then we take each working path w of each extra traffic demand and modify T so that consecutive edges of w that are not already connected are converted to pre-cross-connected. This may cause violations of feasibility conditions, so we also break any existing pre-cross-connected connections in T necessary to restore feasibility. For example, in the sample network of FIGS. 5A-C, if T * has a connection between $e_{17}$ and $e_{18}$, then when the extra traffic is added $e_{18}$ and $e_{22}$ must be connected. Therefore, to maintain the matching condition the connection between $e_{17}$ and $e_{18}$ is broken. At all times, the allocation algorithm maintains two cross-connection tables T and T * which are feasible for X with and without extra traffic respectively. T * is used as the secondary cross-connection table for ROUTEDEMAND. The reason for keeping two cross-connection tables is that when shared protection paths are routed, the extra traffic is not allowed to influence any decisions. Therefore, T * is maintained. At the same time, extra traffic is not entirely ignored lest illegal cross-connections are made in the final network. Thus, T is maintained as well. The allocation algorithm next orders the demands as described above. It then processes the demands one at a time essentially by calling ROUTEDEMAND one or more times to find a routing and updating the network X accordingly.

Essentially the function of finding a routing for a demand is performed by ROUTEDEMAND but there are some complications due to the existence of two different capacities. The allocation algorithm first checks the capacity of d. If the capacity is OC-192, then the allocation algorithm calls ROUTEDEMAND to find a routing and then moves on to updating the network. If the capacity of d is OC-48, then the procedure is more complicated. The allocation algorithm first tries calling ROUTEDEMAND. If a routing is found, then the allocation algorithm takes it and moves on to updating the network. However, if ROUTEDEMAND reports a failure, then the allocation algorithm next examines all already-allocated adjusted OC-192 demands with the same terminal nodes, level of service, and sharing type as d. If any of these adjusted demands has nonzero spare capacity and contains no forbidden nodes/edges of d, then the allocation plan is updated to mux d together with one such adjusted demand. The routing plan for this adjusted demand remains untouched. Since this is the only updating that needs to be done, the allocation algorithm may now skip the update network step and proceed directly to processing the next demand. If the allocation algorithm has still not succeeded in allocating d, then the next step is to make a network $X_0$ which is just like X except that all the unused standard OC-192 edges are converted to OMUX. Actually, not all the unused standard OC-192 edges need to be OMUXed. Only non-forbidden edges need to be OMUXed and at most one OC-192 edge per link needs to be OMUXed. The allocation algorithm then calls ROUTEDEMAND using $X_0$ and moves on to updating the network.

At the point of updating the network, it may be that no routing has been found. If so, then a warning is issued and the allocation algorithm skips directly to the next demand. If a routing has been found, then the allocation algorithm first checks to see if the auxiliary network $X_0$ was created. If so, then let E be the set of previously unused OC-192 edges that the routing of d now uses. The physical graph of X must now indicate that the edges of E are OMUX edges and the logical graph of X must be changed so that each edge of E is replaced with four OMUX OC-48 edges. Furthermore, the lists of forbidden edges of all demands (not just d) must also be updated. Any such list containing an edge of E must now contain the OMUX replacements for E. After processing the auxiliary network $X_0$ or if no auxiliary network $X_0$ was created, the next step is to add the new demand d to the set of traffic demands S and to add its routing to the allocation plan A. The cross-connection tables T and T * are also updated as follows. First, intact connections are added for the span protection path(s) of d, for the working path(s) of d unless its level of service is extra traffic, and for the mesh protection path(s) of d if its sharing type is 1+1. For T *, nothing further is done if the level of service of d is extra traffic. However, if the sharing type of d is 1:N, then all not-connected connections along the mesh protection path(s) of d are converted to pre-cross-connected. The modification for T is performed in the same manner as described above. T is just T * modified to accommodate extra traffic. When all the demands are processed, the allocation algorithm checks each pair of consecutive edges in each mesh protection path of demands with sharing type 1:N and tests all three values of intact, pre-cross-connected, and not connected for each such connection, compiling a table of which possibilities destroy feasibility and which do not. This table becomes an optional output.

Certain other features may be included in the allocation algorithm. The allocation algorithm assumes a fixed finite number of edges on each link but a network may be uncapacitated where there is unlimited bandwidth available on every link. An uncapacitated option may be chosen to generate new edges on a link if the capacity of the link is nearly exhausted. All the subroutines become modified for the uncapacitated option except for the load balancing subroutine which is inherently capacitated. The load balancing subroutine is disabled if the uncapacitated option is selected. Extra traffic that could not be routed may either be upgraded to unprotected traffic or discarded as desired. The bandwidth used by upgraded extra traffic may not be usable by future protection paths. A limit extra traffic option prevents extra traffic from interfering with bypass opportunities for other traffic at a node but does not prohibit extra traffic from being upgraded to unprotected traffic. A limit port count option may also be provided to constrain the allocation algorithm to find mesh protection paths that introduce no more than two new ports into the network. If bypassing at a node is possible, minimizing bandwidth is no longer an accurate method of minimizing cost as port count also becomes important. The shortest path subroutine may have the option of using hop count or actual distance to measure length. The constrained Dijkstra algorithm may have a time limit. If the time limit expires before the constrained Dijkstra algorithm terminates, the constrained Dijkstra algorithm is interrupted and restarted with the source and destination interchanged. The running time for the constrained Dijkstra algorithm can vary dramatically depending on which vertex is taken as the source and the destination.

The algorithms and subroutines described herein are contemplated to be implemented and executed by software programs at one or more nodes of the mesh network. Each node includes one or more network elements for transporting telecommunications traffic throughout the mesh network. Subscribers, customer premises equipment, or other nodes may be set up to communicate with a particular node within the mesh network.

Thus, it is apparent that there has been provided, in accordance with the present invention, a method of allocating protection paths for network demands in a mesh network that satisfies the advantages set forth above. Although the present invention has been described in detail, it should be understood that various changes, substitutions, and alterations may be readily ascertainable by those skilled in the art and made herein. For example, though discussed in terms of a path-based protection implementation, the present invention may also be used to replace the conventional p-cycle approach in link-based implementations. Other examples may be readily ascertainable by those skilled in the art and made herein without departing from the spirit and scope of the present invention as defined by the following claims. Moreover, the present invention is not intended to be limited in any way by any statement made herein that is not otherwise reflected in the following claims.

What is claimed is:

1. A method for allocating protection bandwidth in a telecommunications mesh network, comprising:
   receiving a demand to provide a protection path from a source node to a destination node in the telecommunications mesh network, the demand having a pre-determined working path with a sequence of edges interconnecting the source node to the destination node;
   identifying a pre-cross-connectable protection path that maximizes bandwidth sharing from the source node to the destination node, wherein the pre-cross-connectable protection path does not include any multiple edge branch point conditions within the telecommunications mesh network, wherein the pre-cross-connectable protection path is identified by:
   subdividing one or more pre-cross-connected trails of the telecommunications mesh network into one or more subtrails;
   discarding any subtrail that does not meet any of one or more pre-determined conditions;

creating a logical graph representation of the telecommunications mesh network from subtrails that have not been discarded.

2. The method of claim 1, further comprising:
identifying a failure in the working path;
switching traffic from the working path to the pre-cross-connected protection path in response to the failure.

3. The method of claim 1, further comprising:
determining one or more pre-cross-connected trails associated with the telecommunications mesh network, each pre-cross-connect trail representing a connection between two or more nodes in the telecommunications mesh network with each node being connected by an edge.

4. The method of claim 1, further comprising:
ordering a plurality of demands for processing;
selecting a particular one of the plurality of demands having a highest priority.

5. The method of claim 1, wherein pre-cross-connected trails are discarded if they do not have entirely sharable protection edges.

6. The method of claim 1, wherein the pre-cross-connectable protection path is identified by probing forward from an initial active node in the logical graph to identify allowable partial paths therefrom.

7. The method of claim 6, wherein a partial path is an ordered quadruple identifying the partial path, a length of the partial path, forbidden edges associated with the partial path, and a state of the partial path.

8. The method of claim 1, wherein the pre-cross-connectable protection path does not include any rivals to its edges.

9. The method of claim 1, further comprising:
updating the telecommunications mesh network in response to the pre-cross-connectable protection path associated with the demand.

10. The method of claim 1, wherein a pre-cross-connected trail has connections between successive edges being intact or pre-cross-connected with either its endnodes being identical or edges at the endnodes not being connected.

11. A computer readable medium having code for allocating protection bandwidth in a telecommunications mesh network, the code operable to:
receive a demand to provide a protection path from a source node to a destination node in the telecommunications mesh network, the demand having a pre-determined working path with a sequence of edges interconnecting the source node to the destination node;
identify a pre-cross-connectable protection path that maximizes bandwidth sharing from the source node to the destination node, wherein the pre-cross-connectable protection path does not include any multiple edge branch point conditions within the telecommunications mesh network;
subdivide one or more pre-cross-connected trails of the telecommunications mesh network into one or more subtrails;
discard any subtrail that does not meet any of one or more pre-determined conditions;
create a logical graph representation of the telecommunications network from subtrails that have not been discarded.

12. The computer readable medium of claim 11, wherein the code is further operable to:
update the telecommunications mesh network in response to the pre-cross-connectable protection path.

13. The computer readable medium of claim 11, wherein the code is further operable to:
insert unused, shortcut, and rival edges into the logical graph.

14. The computer readable medium of claim 11, wherein the code is further operable to:
generate a cross-connection table, the cross-connection table including the one or more pre-cross-connection trails.

15. The computer readable medium of claim 11, wherein the code is further operable to:
identify a failure in the working path;
switch traffic from the working path to the pre-cross-connected protection path in response to the failure.

16. A method for allocating protection bandwidth in a telecommunications mesh network, comprising:
receiving a plurality of traffic demands, each traffic demand specifying a source node and a destination node, each traffic demand having a working path with a sequence of edges interconnecting the source node to the destination node through intermediate nodes;
ordering the plurality of traffic demands;
selecting a particular traffic demand having a highest priority;
generating a cross-connection table for the telecommunications mesh network;
pre-cross-connecting un-connected consecutive edges in the telecommunications mesh network;
breaking any pre-cross connections that violate a set of pre-determined conditions;
performing a primary and a secondary routing routine to identify a mesh protection path for the selected traffic demand, wherein the mesh protection path does not include any multiple edge branch point conditions within the telecommunications mesh network, wherein the primary routing routine includes:
subdividing one or more pre-cross-connected trails of the telecommunications mesh network into one or more subtrails;
discarding any subtrail that does not meet any of one or more pre-determined conditions;
creating a logical graph from subtrails that have not been discarded;
inserting unused, shortcut, and rival edges into the logical graph;
identifying a shortest admissible protection path from the source node to the destination node from the logical graph.

17. The method of claim 16, further comprising:
creating an auxiliary network representation in the primary routing routine using a load balancing criteria.

18. The method of claim 16, further comprising:
determining one or more pre-cross-connected trails associated with the telecommunications mesh network, each pre-cross-connect trail representing a connection between two or more nodes in the telecommunications mesh network with each node being connected by an edge.

19. The method of claim 16, wherein the shortest admissible protection path identified maximizes bandwidth sharing in the telecommunications mesh network and does not include any rivals to its edges.

20. The method of claim 16, further comprising:
adjusting an allocation plan for the telecommunications mesh network in response to the mesh protection path.

* * * * *